(12) United States Patent
Moriura et al.

(10) Patent No.: US 12,429,388 B2
(45) Date of Patent: Sep. 30, 2025

(54) LOAD SENSOR FOR DETECTING EXTERNALLY APPLIED LOAD BASED ON CAPACITANCE VARIATION

(71) Applicant: Panasonic Intellectual Property Management Co., Ltd., Osaka (JP)

(72) Inventors: Yuta Moriura, Osaka (JP); Susumu Uragami, Osaka (JP); Takashi Matsumoto, Osaka (JP); Yodai Matsumura, Osaka (JP); Hiroyuki Furuya, Osaka (JP); Hitoshi Ishimoto, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 307 days.

(21) Appl. No.: 18/304,119

(22) Filed: Apr. 20, 2023

(65) Prior Publication Data

US 2023/0258512 A1 Aug. 17, 2023

Related U.S. Application Data

(63) Continuation of application No. PCT/JP2021/026934, filed on Jul. 19, 2021.

(30) Foreign Application Priority Data

Oct. 28, 2020 (JP) .................................. 2020-180300

(51) Int. Cl.
 *G01L 1/14* (2006.01)
(52) U.S. Cl.
 CPC .................................. *G01L 1/142* (2013.01)

(58) Field of Classification Search
 CPC .................................. G01L 1/142; G01L 1/146
 See application file for complete search history.

(56) References Cited

U.S. PATENT DOCUMENTS

| 7,368,921 B2 * | 5/2008 | Deangelis | ............ G01D 5/2405 |
| | | | 324/661 |
| 10,267,690 B2 * | 4/2019 | Wu | ......................... G01L 5/165 |

(Continued)

FOREIGN PATENT DOCUMENTS

| CN | 103868631 A | * | 6/2014 |
| CN | 109923388 A | | 6/2019 |

(Continued)

OTHER PUBLICATIONS

Notice of Reasons for Refusal issued in corresponding Japanese Patent Application No. 2022-558855 dated Jul. 23, 2024, with English translation.

(Continued)

*Primary Examiner* — Octavia Hollington
(74) *Attorney, Agent, or Firm* — Rimon P.C.

(57) ABSTRACT

A load sensor includes: a first base member and a second base member disposed so as to face each other; an electrically-conductive elastic body disposed on an opposing face of the first base member; a wire member that is electrically conductive and disposed between the second base member and the electrically-conductive elastic body; and a dielectric body disposed between the electrically-conductive elastic body and the wire member. The dielectric body has a stress relaxation part for releasing stress applied to the dielectric body during load application.

12 Claims, 12 Drawing Sheets

(56) References Cited

U.S. PATENT DOCUMENTS

| | | | |
|---|---|---|---|
| 10,908,034 B2 | 2/2021 | Moriura et al. | |
| 11,740,141 B2 * | 8/2023 | Uragami | G01L 1/144 |
| | | | 73/862.626 |
| 11,965,785 B2 * | 4/2024 | Moriura | G01L 1/146 |
| 12,146,802 B2 * | 11/2024 | Uragami | G01L 5/22 |
| 2023/0314242 A1 * | 10/2023 | Uragami | G01L 1/146 |
| | | | 73/862.626 |
| 2023/0392997 A1 * | 12/2023 | Moriura | G01L 1/14 |
| 2024/0085256 A1 * | 3/2024 | Matsumura | G01L 1/142 |
| 2024/0142319 A1 * | 5/2024 | Matsumura | G01L 1/142 |
| 2024/0142320 A1 * | 5/2024 | Ukitsu | G01L 1/146 |
| 2024/0219246 A1 * | 7/2024 | Uragami | G01L 1/146 |
| 2024/0230431 A1 * | 7/2024 | Moriura | G01L 1/142 |
| 2024/0264011 A1 * | 8/2024 | Yamamoto | G01L 1/146 |
| 2024/0310223 A1 * | 9/2024 | Uragami | G01L 1/14 |
| 2024/0319026 A1 * | 9/2024 | Uragami | G01L 5/00 |
| 2024/0337542 A1 * | 10/2024 | Yamaguchi | G01L 5/00 |

FOREIGN PATENT DOCUMENTS

| | | | | |
|---|---|---|---|---|
| EP | 2591723 A1 * | 5/2013 | | A61B 5/1036 |
| JP | S6038276 Y2 * | 11/1985 | | |
| JP | H06323929 A | 11/1994 | | |
| JP | 2010-258555 A | 11/2010 | | |
| JP | 2016090319 A * | 5/2016 | | |
| JP | WO2018034159 A1 * | 6/2019 | | G01L 1/148 |
| WO | WO-2018096901 A1 * | 5/2018 | | B62D 1/04 |
| WO | WO-2019166635 A1 * | 9/2019 | | G01L 1/146 |

OTHER PUBLICATIONS

International Search Report issued in corresponding International Patent Application No. PCT/JP2021/026934 dated Aug. 24, 2021, with English translation.

First Office Action received in corresponding Chinese Patent Application No. 202180070639.5, dated Jul. 30, 2025.

\* cited by examiner

EMBODIMENT 1

FIG. 8A EXPERIMENT: EMBODIMENT 1
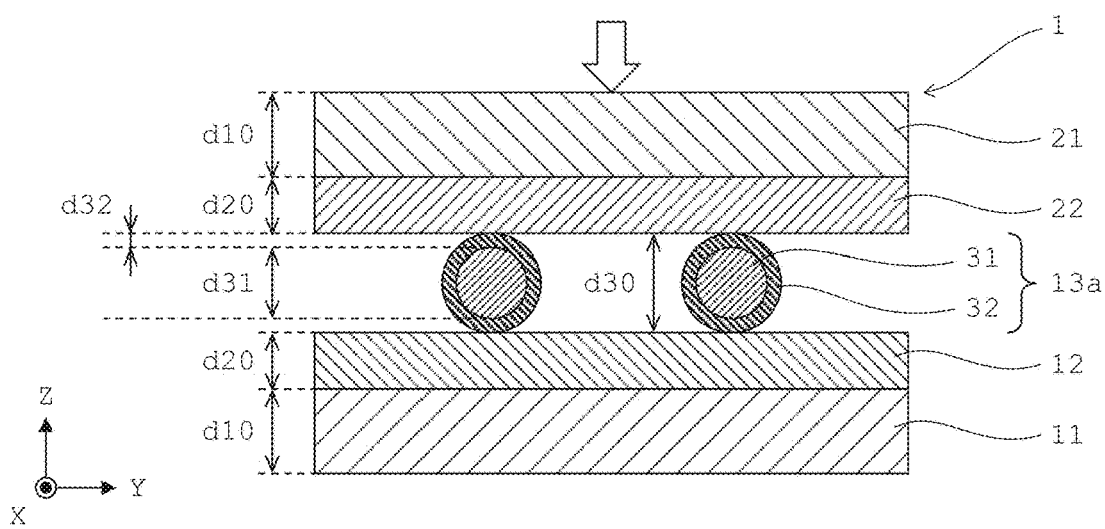
FIG. 8B
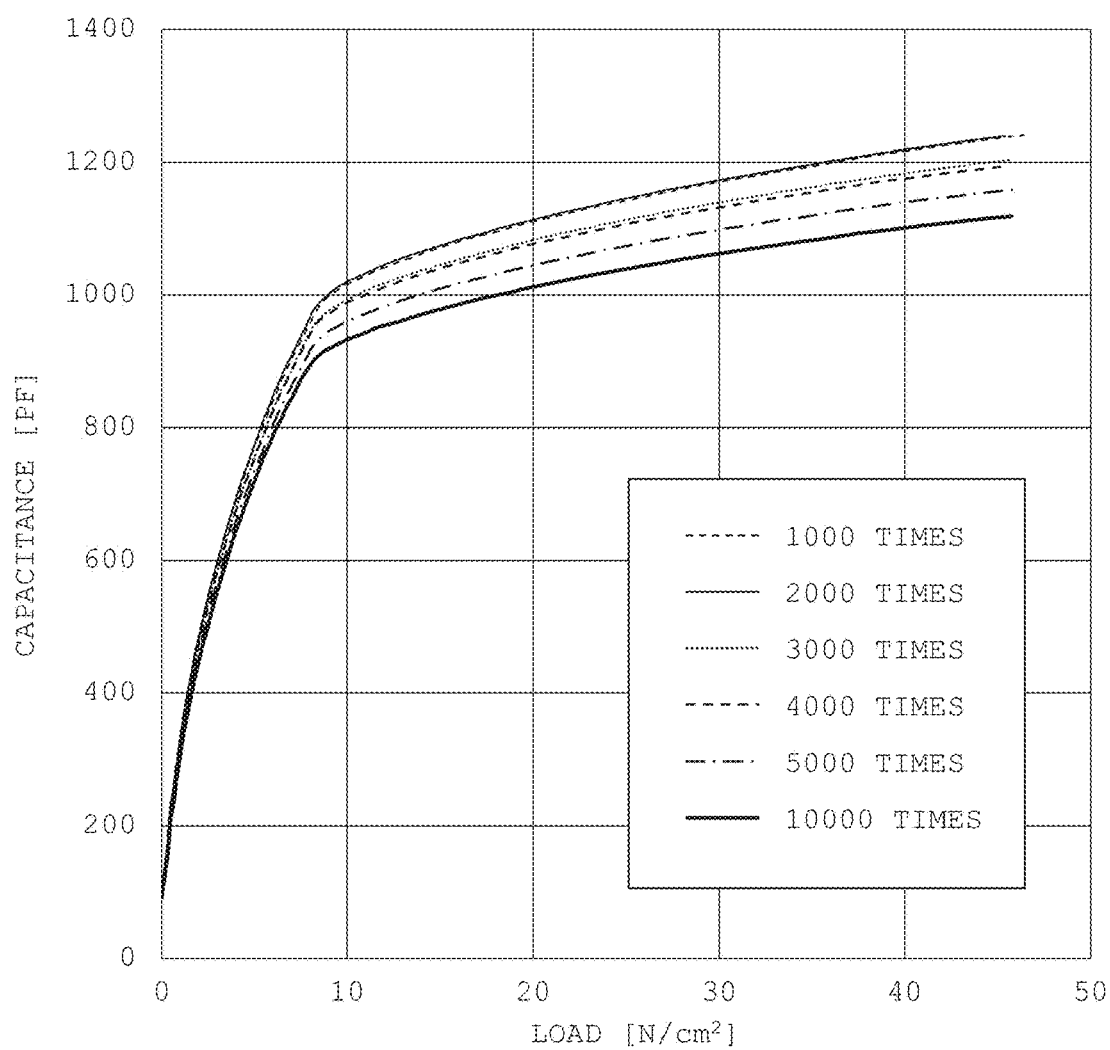

FIG. 9    EMBODIMENT 2
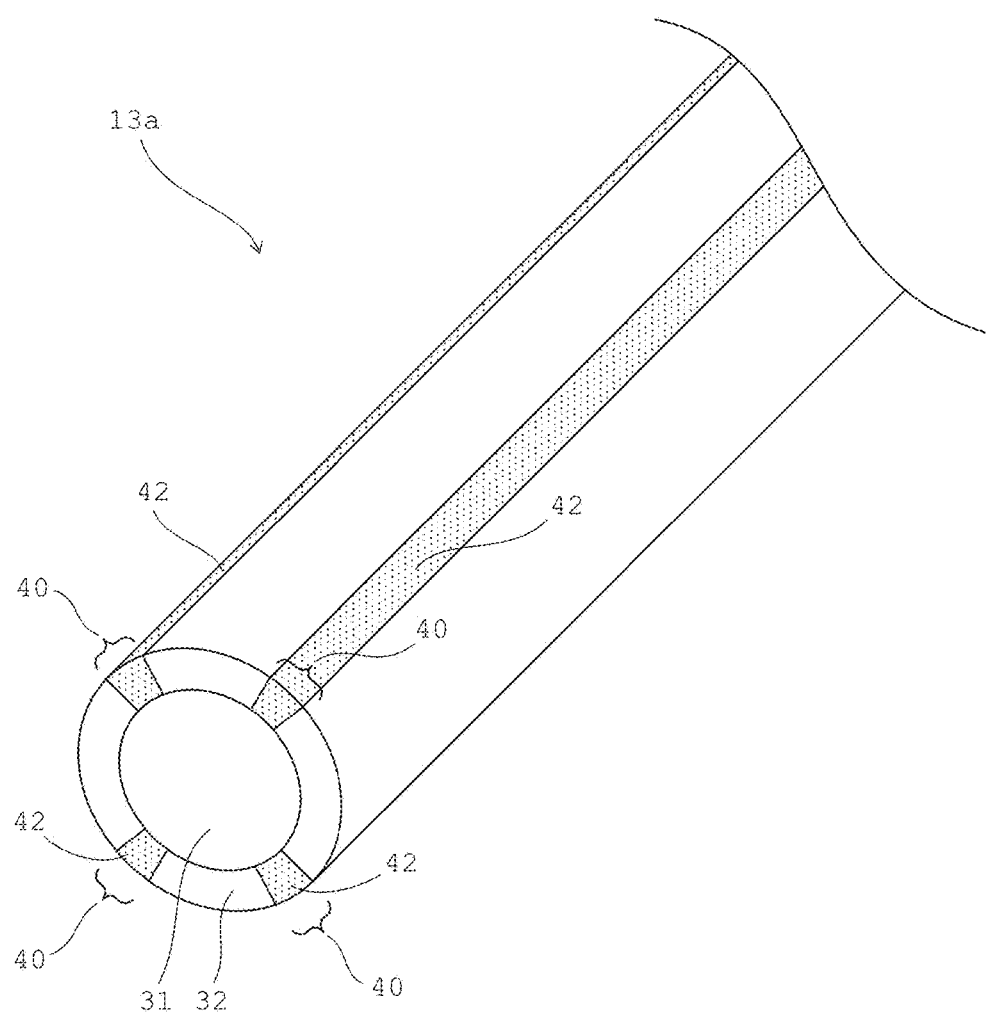

FIG.11  EMBODIMENT 3
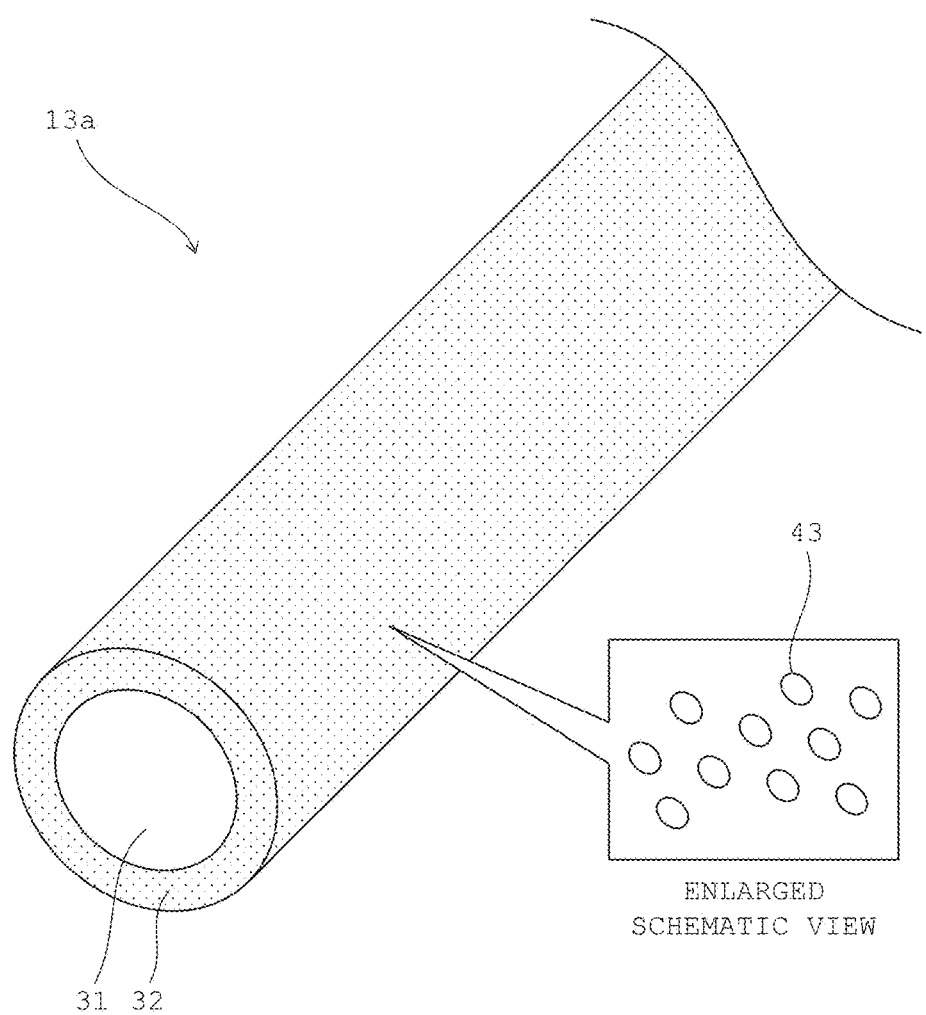

LOAD SENSOR FOR DETECTING EXTERNALLY APPLIED LOAD BASED ON CAPACITANCE VARIATION

CROSS REFERENCE TO RELATED APPLICATION

This application is a continuation of International Application No. PCT/JP2021/026934 filed on Jul. 19, 2021, entitled "LOAD SENSOR", which claims priority under 35 U.S.C. Section 119 of Japanese Patent Application No. 2020-180300 filed on Oct. 28, 2020, entitled "LOAD SENSOR". The disclosures of the above applications are incorporated herein by reference.

BACKGROUND OF THE INVENTION

Field of the Invention

The present invention relates to a load sensor that detects a load applied from outside, based on change in capacitance.

Description of Related Art

Load sensors are widely used in the fields of industrial apparatuses, robots, vehicles, and the like. In recent years, in accordance with advancement of control technologies by computers and improvement of design, development of electronic apparatuses that use a variety of free-form surfaces such as those in human-form robots and interior equipment of automobiles is in progress. In association therewith, it is required to mount a high performance load sensor to each free-form surface.

International Publication No. 2018/096901 describes a pressure-sensitive element that includes: a sensor part to which a pressing force is applied; and a detector that detects the pressing force. In this pressure-sensitive element, the sensor part includes: a first electrically-conductive member; a second electrically-conductive member sandwiched between the first electrically-conductive member and a base member; and a dielectric body. The first electrically-conductive member has elasticity. The second electrically-conductive member is formed in a linear shape, and disposed in a wave shape along a certain main direction. The dielectric body is disposed between the first electrically-conductive member and the second electrically-conductive member, and at least partially covers a surface of the first electrically-conductive member or a surface of the second electrically-conductive member. The detector detects a pressing force, based on change in capacitance between the first electrically-conductive member and the second electrically-conductive member.

In the above configuration, when the sensor part receives a large load, the dielectric body may be broken due to the stress. In this case, when a short circuit has occurred between the first electrically-conductive member and the second electrically-conductive member in the broken portion, the load cannot be appropriately detected.

SUMMARY OF THE INVENTION

An aspect of the present invention relates to a load sensor. The load sensor according to the present aspect includes: a first base member and a second base member disposed so as to face each other; an electrically-conductive elastic body disposed on an opposing face of the first base member; a wire member that is electrically conductive and disposed between the second base member and the electrically-conductive elastic body; and a dielectric body disposed between the electrically-conductive elastic body and the wire member. The dielectric body has a stress relaxation part for releasing stress applied to the dielectric body during load application.

According to the load sensor of the present aspect, the stress applied to the dielectric body during load application is released by the stress relaxation part. Accordingly, a large stress is inhibited from being applied to the dielectric body, and thus, breakage of the dielectric body due to the stress during load application can be prevented. Therefore, the load can be appropriately detected while breakage of the dielectric body is inhibited.

The effects and the significance of the present invention will be further clarified by the description of the embodiments below. However, the embodiments below are merely examples for implementing the present invention. The present invention is not limited to the embodiments below in any way.

BRIEF DESCRIPTION OF THE DRAWINGS

FIG. 8A is a diagram describing the size of each component of the load sensor used in an experiment, according to Embodiment 1;

FIG. 8B is a graph showing the relationship between the load and the capacitance obtained in the experiment, according to Embodiment 1;

FIG. 9 is a perspective view schematically showing a configuration of the conductor wire, according to Embodiment 2;

FIG. 11 is a perspective view schematically showing a configuration of the conductor wire, according to Embodiment 3.

Figure 1A:
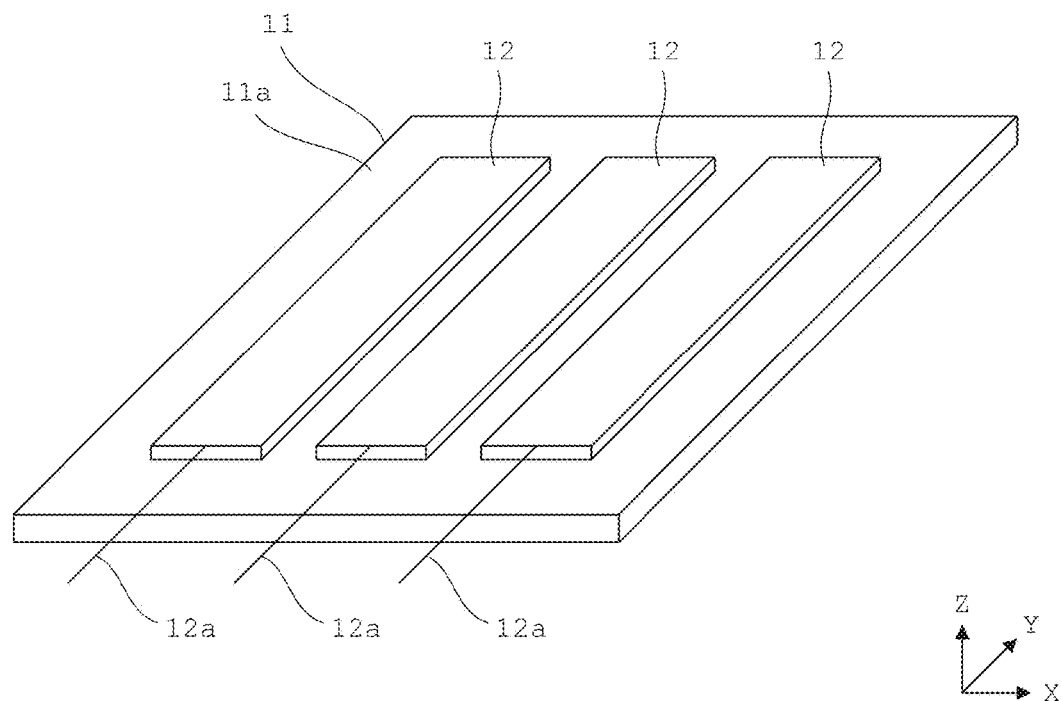
FIG. 1A is a perspective view schematically showing a base member on the lower side and electrically-conductive elastic bodies set on an opposing face of the base member on the lower side, according to Embodiment 1.

It is noted that the drawings are solely for description and do not limit the scope of the present invention in any way.

DETAILED DESCRIPTION

The load sensor according to the present invention is applicable to a load sensor of a management system or an electronic apparatus that performs processing in accordance with an applied load.

Examples of the management system include a stock management system, a driver monitoring system, a coaching management system, a security management system, and a caregiving/nursing management system.

In the stock management system, for example, by a load sensor provided to a stock shelf, the load of a placed stock is detected, and the kinds of commodities and the number of commodities present on the stock shelf are detected. Accordingly, in a store, a factory, a warehouse, and the like, the stock can be efficiently managed, and manpower saving can be realized. In addition, by a load sensor provided in a refrigerator, the load of food in the refrigerator is detected, and the kinds of the food and the quantity and amount of the food in the refrigerator are detected. Accordingly, a menu that uses food in a refrigerator can be automatically proposed.

In the driver monitoring system, by a load sensor provided to a steering device, the distribution of a load (e.g., gripping force, grip position, tread force) applied to the steering device by a driver is monitored, for example. In addition, by a load sensor provided to a vehicle-mounted seat, the distribution of a load (e.g., the position of the center of gravity) applied to the vehicle-mounted seat by the driver in a seated state is monitored. Accordingly, the driving state (sleepiness, mental state, and the like) of the driver can be fed back.

In the coaching management system, for example, by a load sensor provided to the bottom of a shoe, the load distribution at a sole is monitored. Accordingly, correction or guidance to an appropriate walking state or running state can be realized.

In the security management system, for example, by a load sensor provided to a floor, the load distribution is detected when a person passes, and the body weight, stride, passing speed, shoe sole pattern, and the like are detected. Accordingly, the person who has passed can be identified by checking these pieces of detection information against data.

In the caregiving/nursing management system, for example, by load sensors provided to bedclothes and a toilet seat, the distributions of loads applied by a human body to the bedclothes and the toilet seat are monitored. Accordingly, at the positions of the bedclothes and the toilet seat, what action the person is going to take is estimated, whereby tumbling or falling can be prevented.

Examples of the electronic apparatus include a vehicle-mounted apparatus (car navigation system, audio apparatus, etc.), a household electrical appliance (electric pot, IH cooking heater, etc.), a smartphone, an electronic paper, an electronic book reader, a PC keyboard, a game controller, a smartwatch, a wireless earphone, a touch panel, an electronic pen, a penlight, lighting clothes, and a musical instrument. In an electronic apparatus, a load sensor is provided to an input part that receives an input from a user.

The load sensors in the embodiments below are each a capacitance-type load sensor that is typically provided in a load sensor of a management system or an electronic apparatus as described above. Such a load sensor may be referred to as a "capacitance-type pressure-sensitive sensor element", a "capacitive pressure detection sensor element", a "pressure-sensitive switch element", or the like. The load sensor in the embodiments below is connected to a detection circuit, and the load sensor and the detection circuit form a load detection device. The embodiments below are examples of embodiments of the present invention, and the present invention is not limited to the embodiments below in any way.

Hereinafter, embodiments of the present invention will be described with reference to the drawings. For convenience, X-, Y-, and Z-axes orthogonal to each other are indicated in the drawings. The Z-axis direction is the height direction of a load sensor 1.

Embodiment 1

A configuration of the load sensor 1 will be described with reference to FIG. 1A to FIG. 4.

FIG. 1A is a perspective view schematically showing a base member 11, and three electrically-conductive elastic bodies 12 set on an opposing face 11a (the face on the Z-axis positive side) of the base member 11.

The base member 11 is an insulative member having elasticity, and has a flat plate shape parallel to an X-Y plane. The base member 11 is formed from a non-electrically-conductive resin material or a non-electrically-conductive rubber material. The resin material used in the base member 11 is a resin material of at least one type selected from the group consisting of a styrene-based resin, a silicone-based resin (e.g., polydimethylpolysiloxane (PDMS)), an acrylic resin, a rotaxane-based resin, a urethane-based resin, and the like, for example. The rubber material used in the base member 11 is a rubber material of at least one type selected from the group consisting of silicone rubber, isoprene rubber, butadiene rubber, styrene-butadiene rubber, chloroprene rubber, nitrile rubber, polyisobutylene, ethylene-propylene rubber, chlorosulfonated polyethylene, acrylic rubber, fluororubber, epichlorohydrin rubber, urethane rubber, natural rubber, and the like, for example.

The electrically-conductive elastic bodies 12 are formed on the opposing face 11a (the face on the Z-axis positive side) of the base member 11. In FIG. 1A, three electrically-conductive elastic bodies 12 are formed on the opposing face 11a of the base member 11. Each electrically-conductive elastic body 12 is an electrically-conductive member having elasticity. The electrically-conductive elastic bodies 12 each have a band-like shape that is long in the Y-axis direction, and are formed so as to be arranged with a predetermined interval therebetween in the X-axis direction. At an end portion on the Y-axis negative side of each electrically-conductive elastic body 12, a cable 12a electrically connected to the electrically-conductive elastic body 12 is set.

Each electrically-conductive elastic body 12 is formed on the opposing face 11a of the base member 11 by a printing method such as screen printing, gravure printing, flexographic printing, offset printing, or gravure offset printing. With these printing methods, the electrically-conductive elastic body 12 can be formed so as to have a thickness of about 0.001 mm to 0.5 mm on the opposing face 11a of the base member 11.

Each electrically-conductive elastic body 12 is formed from a resin material and an electrically-conductive filler dispersed therein, or from a rubber material and an electrically-conductive filler dispersed therein.

Similar to the resin material used in the base member 11 described above, the resin material used in the electrically-conductive elastic body 12 is a resin material of at least one type selected from the group consisting of a styrene-based resin, a silicone-based resin (polydimethylpolysiloxane (e.g., PDMS)), an acrylic resin, a rotaxane-based resin, a urethane-based resin, and the like, for example. Similar to the rubber material used in the base member 11 described above, the rubber material used in the electrically-conductive elastic body 12 is a rubber material of at least one type selected from the group consisting of silicone rubber, isoprene rubber, butadiene rubber, styrene-butadiene rubber, chloroprene rubber, nitrile rubber, polyisobutylene, ethylene-propylene rubber, chlorosulfonated polyethylene, acrylic rubber, fluororubber, epichlorohydrin rubber, urethane rubber, natural rubber, and the like, for example.

The electrically-conductive filler used in the electrically-conductive elastic body 12 is a material of at least one type selected from the group consisting of: metal materials such as Au (gold), Ag (silver), Cu (copper), C (carbon), ZnO (zinc oxide), $In_2O_3$ (indium oxide (III)), and $SnO_2$ (tin oxide (IV)); electrically-conductive macromolecule materials such as PEDOT:PSS (i.e., a complex composed of poly(3,4-ethylenedioxythiophene) (PEDOT) and polystyrene sulfonate (PSS)); electrically-conductive fibers such as a metal-coated organic matter fiber and a metal wire (fiber state); and the like, for example.

Figure 1B:
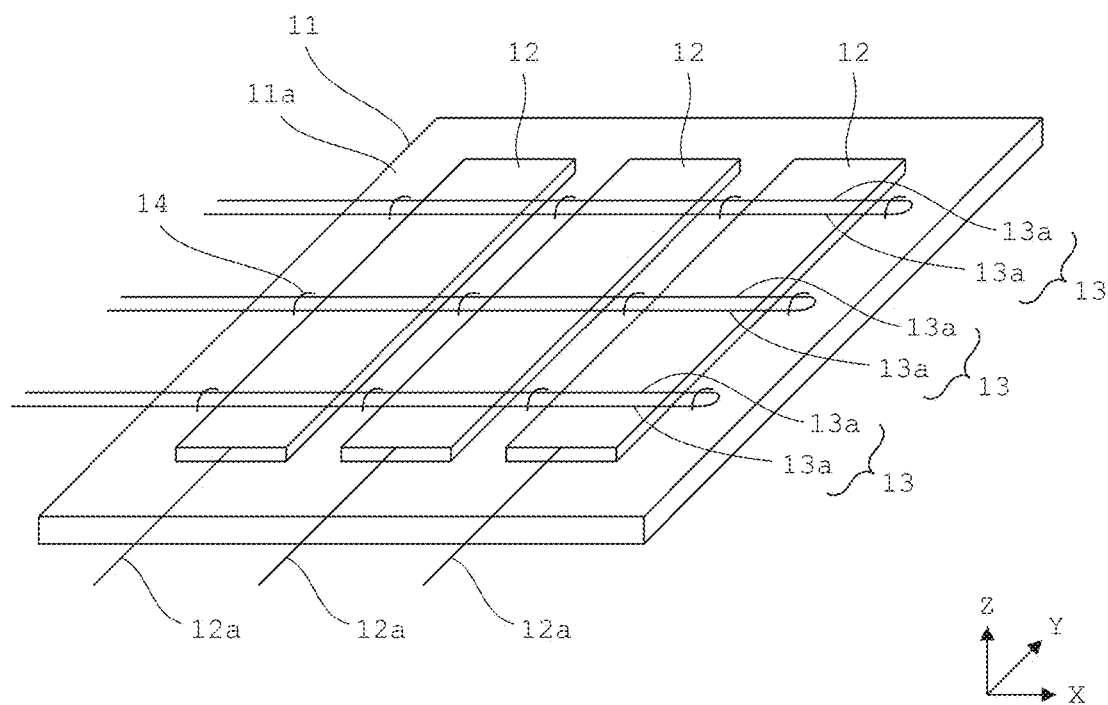
FIG. 1B is a perspective view schematically showing pairs of conductor wires and threads, according to Embodiment 1.

FIG. 1B is a perspective view schematically showing three pairs of conductor wires 13 and twelve threads 14 which are placed on the structure shown in FIG. 1A.

Each pair of conductor wires 13 is formed by bending one conductor wire extending in the X-axis direction, and includes two conductor wires 13a extending from the bent position toward the X-axis negative direction. Two conductor wires 13a forming a pair of conductor wires 13 are disposed so as to be arranged with a predetermined interval therebetween. The pair of conductor wires 13 are disposed so as to be superposed on the upper faces of the three electrically-conductive elastic bodies 12 shown in FIG. 1A. Here, three pairs of conductor wires 13 are disposed so as to be superposed on the upper faces of the three electrically-conductive elastic bodies 12. The three pairs of conductor wires 13 are disposed so as to cross the electrically-conductive elastic bodies 12, and are disposed so as to be arranged with a predetermined interval therebetween, along the longitudinal direction (the Y-axis direction) of the electrically-conductive elastic bodies 12. Each pair of conductor wires 13 is disposed, extending in the X-axis direction, so as to extend across the three electrically-conductive elastic bodies 12. Each conductor wire 13a includes an electrically-conductive member having a linear shape, and a dielectric body formed on the surface of the electrically-conductive member. The configuration of the conductor wire 13a will be described later with reference to FIGS. 3A, 3B.

After the three pairs of conductor wires 13 have been disposed as in FIG. 1B, each pair of conductor wires 13 is set on the base member 11 by threads 14 so as to be movable in the direction (the X-axis direction) in which the pair of conductor wires 13 extends. In the example shown in FIG. 1B, twelve threads 14 set the pairs of conductor wires 13 to the base member 11 at positions other than the positions where the electrically-conductive elastic bodies 12 and the pairs of conductor wires 13 overlap each other. Each thread 14 is implemented by a chemical fiber, a natural fiber, a mixed fiber of the chemical fiber and the natural fiber, or the like.

Figure 2A:
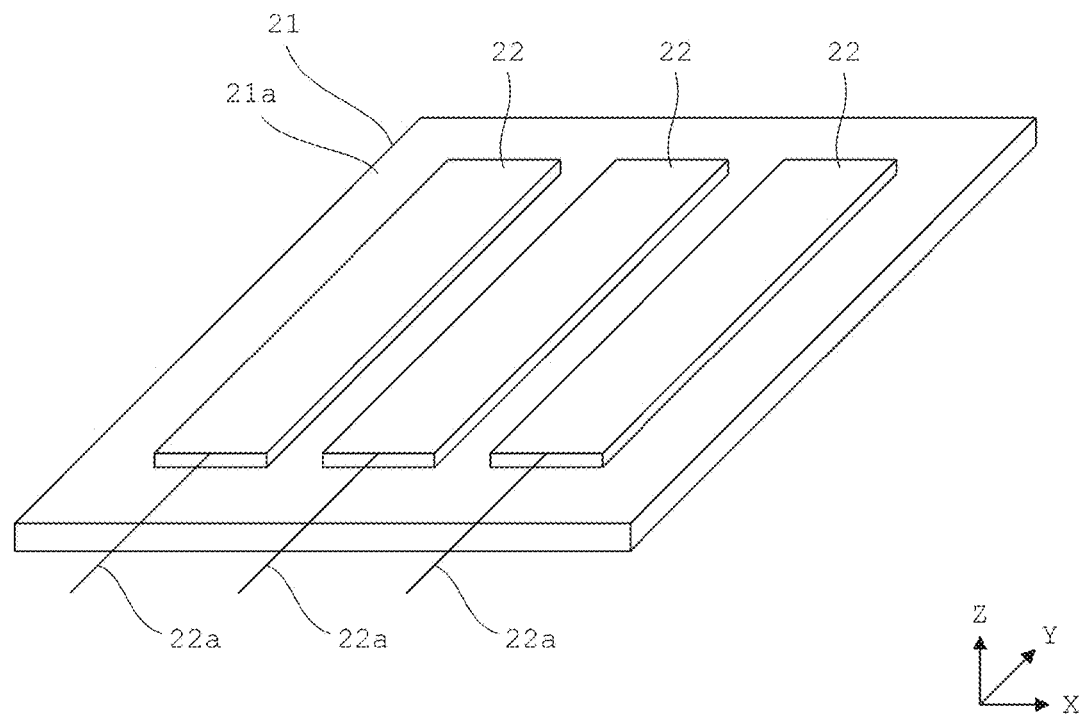
FIG. 2A is a perspective view schematically showing a base member on the upper side and electrically-conductive elastic bodies set on an opposing face of the base member on the upper side, according to Embodiment 1.

FIG. 2A is a perspective view schematically showing a base member 21 disposed so as to be superposed on the upper side of the base member 11, and three electrically-conductive elastic bodies 22 set on an opposing face 21a (the face on the Z-axis negative side) of the base member 21.

The base member 21 has the same size and shape as those of the base member 11, and is formed from the same material as that of the base member 11. The electrically-conductive elastic bodies 22 are formed, on the opposing face 21a (the face on the Z-axis negative side) of the base member 21, at positions opposing the electrically-conductive elastic bodies 12, and are formed so as to be arranged with a predetermined interval therebetween in the X-axis direction. Each electrically-conductive elastic body 22 has the same size and shape as those of the electrically-conductive elastic body 12, and is formed from the same material as that of the electrically-conductive elastic body 12. Similar to the electrically-conductive elastic body 12, the electrically-conductive elastic body 22 is formed on the face on the Z-axis negative side of the base member 21 by a predetermined printing method. At an end portion on the Y-axis negative side of each electrically-conductive elastic body 22, a cable 22a electrically connected to the electrically-conductive elastic body 22 is set.

Figure 2B:
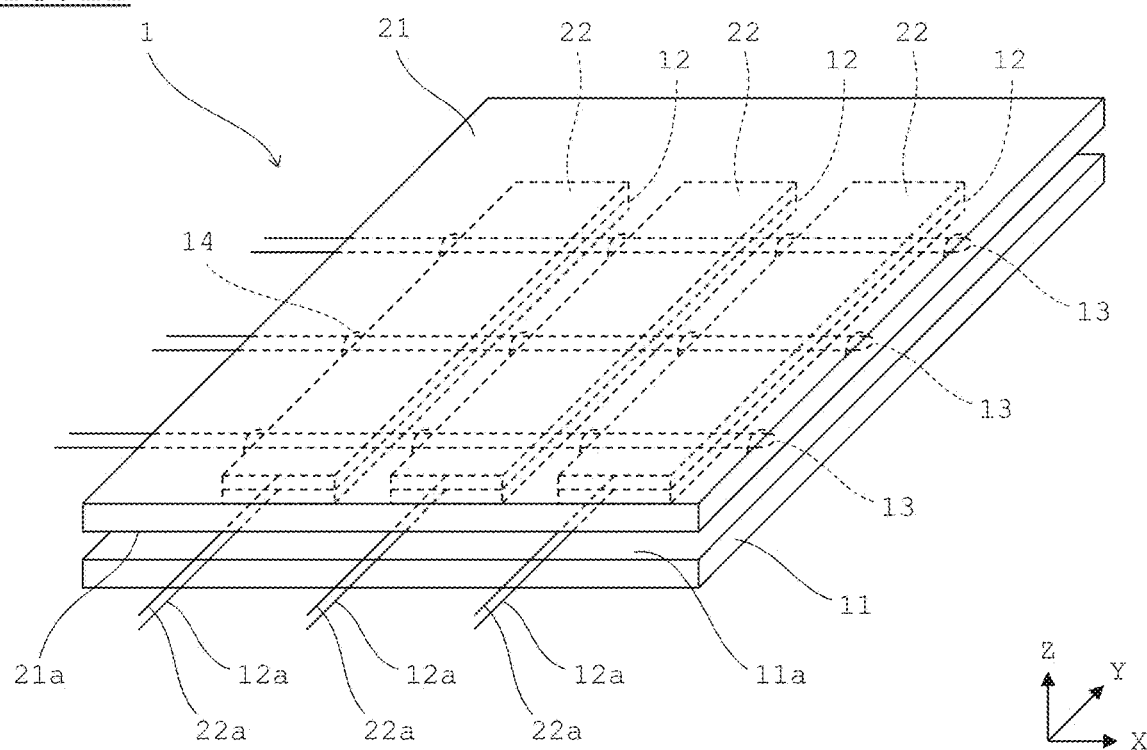
FIG. 2B is a perspective view schematically showing a load sensor of which assembly has been completed, according to Embodiment 1.

FIG. 2B is a perspective view schematically showing a state where the structure in FIG. 2A is set on the structure in FIG. 1B.

The structure shown in FIG. 2A is disposed from above (the Z-axis positive side) the structure shown in FIG. 1B. At this time, the base member 11 and the base member 21 are disposed such that: the opposing face 11a and the opposing face 21a face each other; and the electrically-conductive elastic bodies 12 and the electrically-conductive elastic bodies 22 are superposed with each other. Then, outer peripheral four sides of the base member 21 are connected to the outer peripheral four sides of the base member 11 with a silicone rubber-based adhesive, a thread, or the like, whereby the base member 11 and the base member 21 are fixed to each other. Accordingly, the three pairs of conductor wires 13 are sandwiched by the three electrically-conductive elastic bodies 12 and the three electrically-conductive elastic bodies 22. Thus, as shown in FIG. 2B, the load sensor 1 is completed.

Figure 3A:
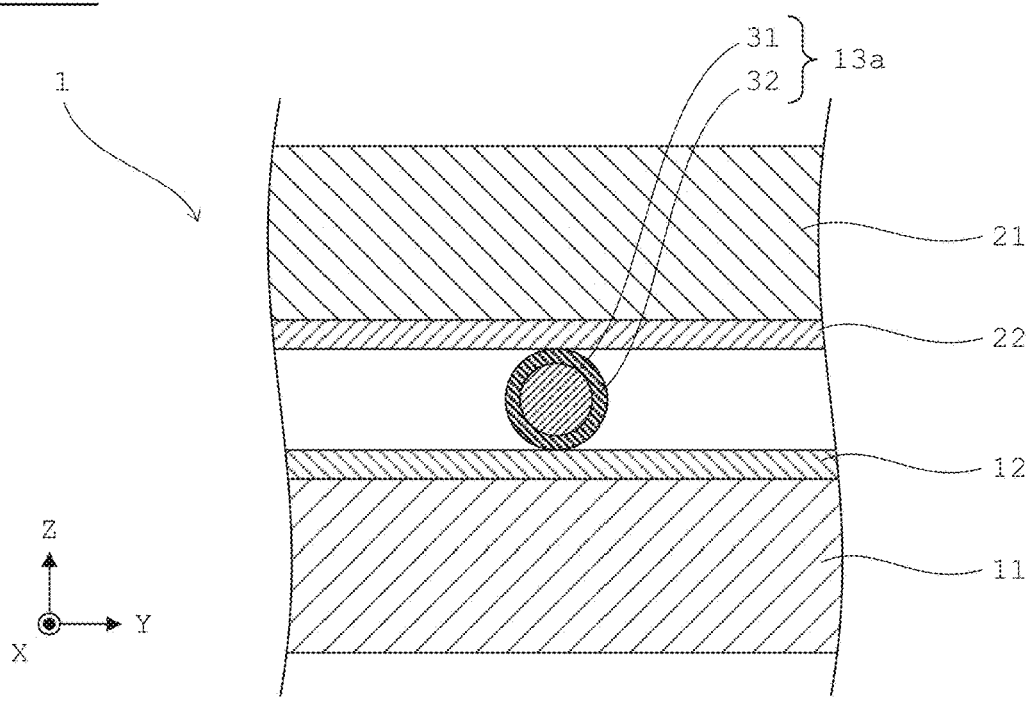
FIG. 3A and FIG. 3B are each a cross-sectional view schematically showing surroundings of a conductor wire viewed in an X-axis negative direction, according to Embodiment 1.
Figure 3B:
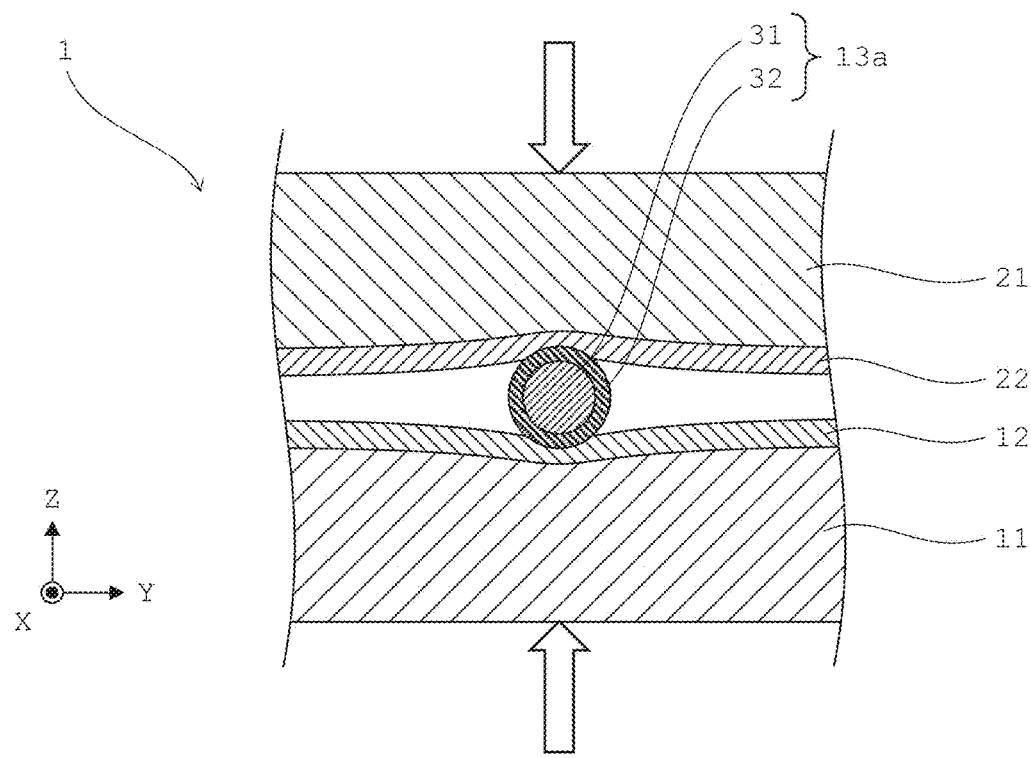

FIGS. 3A, 3B are each a cross-sectional view schematically showing surroundings of a conductor wire 13a viewed in the X-axis negative direction. FIG. 3A shows a state where no load is applied, and FIG. 3B shows a state where loads are applied.

As shown in FIGS. 3A, 3B, the conductor wire 13a is composed of a wire member 31 and a dielectric body 32 formed on the wire member 31.

The wire member 31 is formed from an electrically-conductive metal material, for example. Other than this, the wire member 31 may be composed of a core wire made of glass, and an electrically-conductive layer formed on the surface of the core wire. Alternatively, the wire member 31 may be composed of a core wire made of resin, and an electrically-conductive layer formed on the surface of the core wire, for example. In Embodiment 1, the wire member 31 is formed from aluminum. The dielectric body 32 has an electric insulation property, and is formed from a resin material, a ceramic material, a metal oxide material, or the like, for example. In Embodiment 1, the dielectric body 32 is formed from aluminum oxide (alumina).

It is noted that the dielectric body 32 includes a stress relaxation part 40 (see FIG. 5 to FIG. 6B), but the stress relaxation part 40 is not shown in FIGS. 3A, 3B, for convenience. The stress relaxation part 40 will be described later with reference to FIG. 5 to FIG. 6B.

As shown in FIG. 3A, when no load is applied, the force applied between the electrically-conductive elastic body 12 and the conductor wire 13a, and the force applied between the electrically-conductive elastic body 22 and the conductor wire 13a are substantially zero. From this state, as shown in FIG. 3B, when a load is applied in the upward direction to the lower face of the base member 11 and a load is applied in the downward direction to the upper face of the base member 21, the electrically-conductive elastic bodies 12, 22 are deformed by the conductor wire 13a.

As shown in FIG. 3B, when loads are applied, the conductor wire 13a is brought close to the electrically-conductive elastic bodies 12, 22 so as to be wrapped by the electrically-conductive elastic bodies 12, 22, and the contact area between the conductor wire 13a and the electrically-conductive elastic body 12, 22 increases. Accordingly, the capacitance between the wire member 31 and the electrically-conductive elastic body 12 and the capacitance between the wire member 31 and the electrically-conductive elastic body 22 change. Then, the capacitance in the region of the conductor wire 13a is detected, whereby the load applied to this region is calculated.

Figure 4:
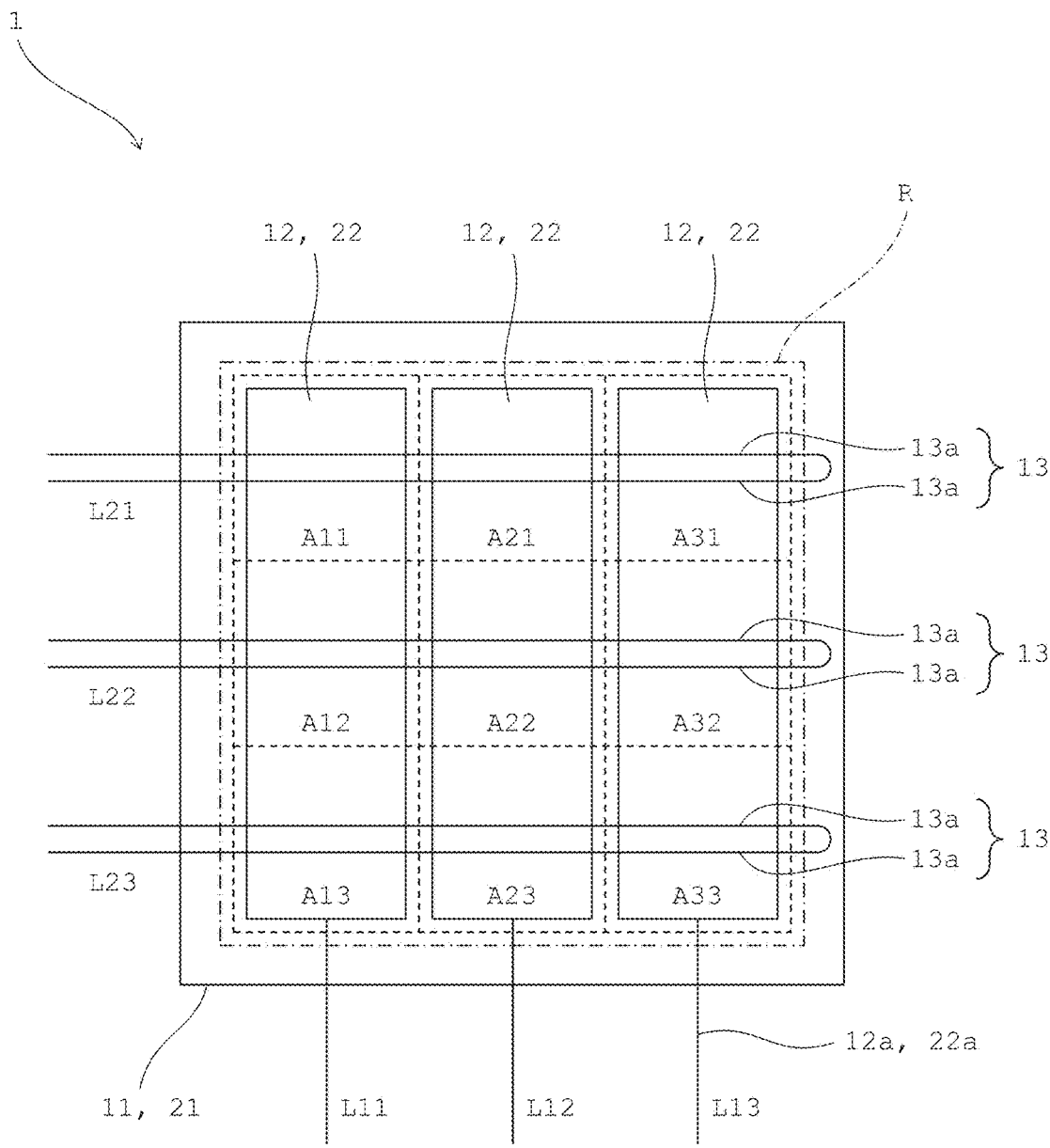
FIG. 4 is a plan view schematically showing the inside of the load sensor viewed in a Z-axis negative direction, according to Embodiment 1.

FIG. 4 is a plan view schematically showing the inside of the load sensor 1 viewed in the Z-axis negative direction. In FIG. 4, threads 14 are not shown, for convenience.

In a measurement region R of the load sensor 1, nine sensor parts arranged in the X-axis direction and the Y-axis direction are set. Specifically, nine regions obtained by dividing the measurement region R into three in the X-axis direction and dividing the measurement region R into three in the Y-axis direction are assigned as the nine sensor parts. The boundary of each sensor part is in contact with the boundary of a sensor part adjacent thereto. The nine sensor parts correspond to nine positions where the electrically-conductive elastic bodies 12, 22 and the pairs of conductor wires 13 cross each other. At the nine positions, nine sensor parts A11, A12, A13, A21, A22, A23, A31, A32, A33 in each of which capacitance changes in accordance with a load are formed.

Each sensor part includes electrically-conductive elastic bodies 12, 22 and a pair of conductor wires 13, and the pair of conductor wires 13 forms one pole (e.g., positive pole) for capacitance, and the electrically-conductive elastic bodies 12, 22 form the other pole (e.g., negative pole) for capacitance. That is, the wire member 31 (see FIGS. 3A, 3B) in the pair of conductor wires 13 forms one electrode of the load sensor 1 (capacitance-type load sensor), the electrically-conductive elastic bodies 12, 22 form the other electrode of the load sensor 1 (capacitance-type load sensor), and the dielectric body 32 (see FIGS. 3A, 3B) in the pair of conductor wires 13 corresponds to a dielectric body that defines capacitance in the load sensor 1 (capacitance-type load sensor).

When a load is applied in the Z-axis direction to each sensor part, the pair of conductor wires 13 (two conductor wires 13a) is wrapped by the electrically-conductive elastic body 12, 22 due to the load. Accordingly, the contact area between the pair of conductor wires 13 and the electrically-conductive elastic body 12, 22 changes, and the capacitance between the pair of conductor wires 13 and the electrically-conductive elastic body 12, 22 changes.

End portions on the X-axis negative side of each pair of conductor wires 13, an end portion on the Y-axis negative side of each cable 12a, and an end portion on the Y-axis negative side of each cable 22a are connected to a detection circuit provided for the load sensor 1.

As shown in FIG. 4, the cables 12a, 22a drawn from the three sets of electrically-conductive elastic bodies 12, 22 will be referred to as lines L11, L12, L13, and the wire members 31 in the three pairs of conductor wires 13 will be referred to as lines L21, L22, L23. The positions at which the electrically-conductive elastic bodies 12, 22 connected to the line L11 cross the lines L21, L22, L23 are the sensor parts A11, A12, A13, respectively. The positions at which the electrically-conductive elastic bodies 12, 22 connected to the line L12 cross the lines L21, L22, L23 are the sensor parts A21, A22, A23, respectively. The positions at which the electrically-conductive elastic bodies 12, 22 connected to the line L13 cross the lines L21, L22, L23 are the sensor parts A31, A32, A33, respectively.

When a load is applied to the sensor part A11, the contact area between the pair of conductor wires 13 and the electrically-conductive elastic body 12, 22 increases in the sensor part A11. Therefore, when the capacitance between the line L11 and the line L21 is detected, the load applied to the sensor part A11 can be calculated. Similarly, in another sensor part as well, when the capacitance between two lines crossing each other in the other sensor part is detected, the load applied to the other sensor part can be calculated.

Figure 5:
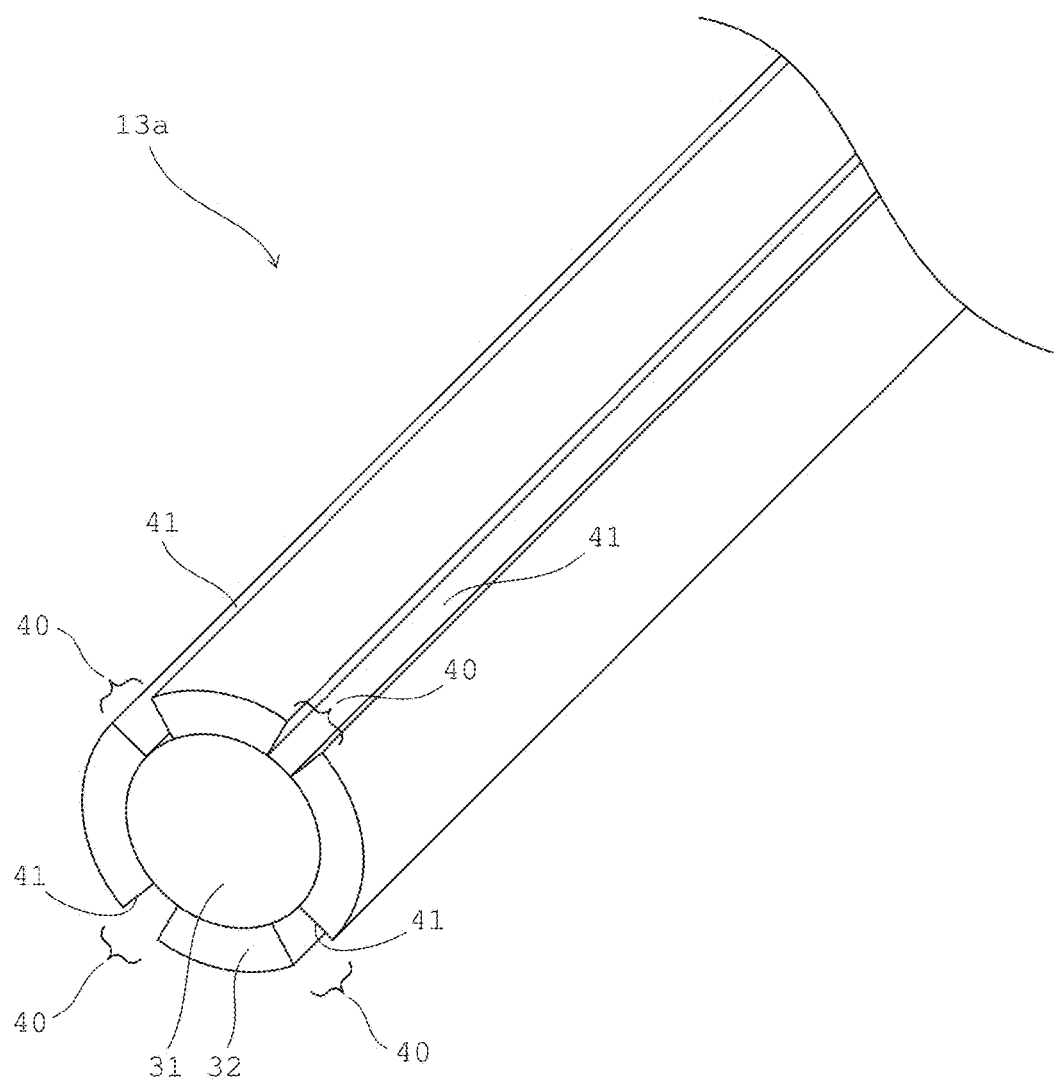
FIG. 5 is a perspective view schematically showing a configuration of the conductor wire, according to Embodiment 1.

FIG. 5 is a perspective view schematically showing a configuration of the conductor wire 13a.

As the wire member 31, a valve action metal such as aluminum (Al), titanium (Ti), tantalum (Ta), niobium (Nb), zirconium (Zr), or hafnium (Hf); tungsten (W); molybdenum (Mo); copper (Cu); nickel (Ni); silver (Ag); gold (Au); or the like is used. The diameter of the wire member 31 may be not less than 10 μm and not greater than 1500 μm, and may be not less than 50 μm and not greater than 800 μm, for example. Such a configuration of the wire member 31 is preferable from the viewpoint of the resistance and the strength of the wire member. The thickness of the dielectric body 32 is preferably not less than 5 nm and not greater than 100 μm, and can be selected as appropriate according to the design of the sensitivity of the sensor.

In Embodiment 1, as described above, the conductor wire 13a is composed of the wire member 31 made of aluminum, and the dielectric body 32 made of aluminum oxide. Here, the dielectric body 32 made of aluminum oxide is formed, through anodization (alumite treatment), on the surface of the wire member 31 made of aluminum. Accordingly, a film of an oxide (alumite) of aluminum is formed on the surface of the wire member 31. Anodization (alumite treatment) is performed by applying an appropriate voltage (1 to 500 V) under a condition of 0° C. to 80° C. while using an organic acid solution or an inorganic acid solution of sulfuric acid, oxalic acid, phosphoric acid, boric acid, or the like. At this time, the stress relaxation part 40 for releasing stress applied to the dielectric body 32 during load application is formed to the dielectric body 32 formed on the surface of the wire member 31. Here, the stress relaxation part 40 is a region where the dielectric body 32 is not formed. The stress relaxation part 40 of Embodiment 1 is a clearance 41 that has a crack shape and that is formed in the dielectric body 32.

An arithmetic average roughness Ra at the surface of the dielectric body 32 may be not less than 0.01 μm and not greater than 100 μm, and may be not less than 0.05 μm and not greater than 50 μm, for example. In such a case, the dielectric body 32 can have a moderate interface adhesion to the electrically-conductive elastic bodies 12, 22. The arithmetic average roughness Ra may be obtained as follows: an average line of the locus of the boundary surface is obtained at a cross section, at three points, perpendicular to the longitudinal direction of the wire member 31; Ra based on each average line is measured in accordance with JIS B0601-1994; and the average value of the three measurement values is used as the arithmetic average roughness Ra.

When the dielectric body 32 is an oxide of aluminum, the dielectric body 32 may contain S, P, and N in an amount of 0.1 to 10 atm % other than aluminum as the main component. In such a case, the stress relaxation property of the dielectric body 32 itself is improved, and a crack or the like due to external pressure, impact, or the like can be inhibited. The dielectric body 32 that is amorphous is preferable because a similar effect can be obtained.

The clearance 41 is formed through adjustment of the film growth in the anodization (alumite treatment). For example, when a film of the dielectric body 32 (aluminum oxide) is caused to grow at a high speed, a clearance 41 having a crack shape can be generated in the dielectric body 32. In addition, depending on the conditions of the anodization (alumite treatment), the width of the clearance 41 in the circumferential direction of the wire member 31, and the length of the clearance 41 in the radial direction of the wire member 31 can be controlled. The width in the circumferential direction of the clearance 41 is 0.5 μm to 5 μm. The clearance 41 is formed such that the width thereof is increased (from the center of the wire member 31 toward the outside) toward the surface of the dielectric body 32. The clearance 41 penetrates the dielectric body 32 in the thickness direction thereof. The clearance 41 is formed in the dielectric body 32 along the direction (the X-axis direction) in which the wire member 31 extends.

Preferably, the clearance 41 has a length of not less than ⅓ from the surface side with respect to the thickness of the dielectric body 32, and has a linear shape having a length of not less than 3 times in the longitudinal direction with respect to the width. Accordingly, an appropriate stress relaxation effect can be realized. In a cross section perpendicular to the longitudinal direction of the wire member 31, when the clearance 41 is formed at not less than two places and preferably not less than four places, the stress relaxation effect is increased.

Figure 6A:
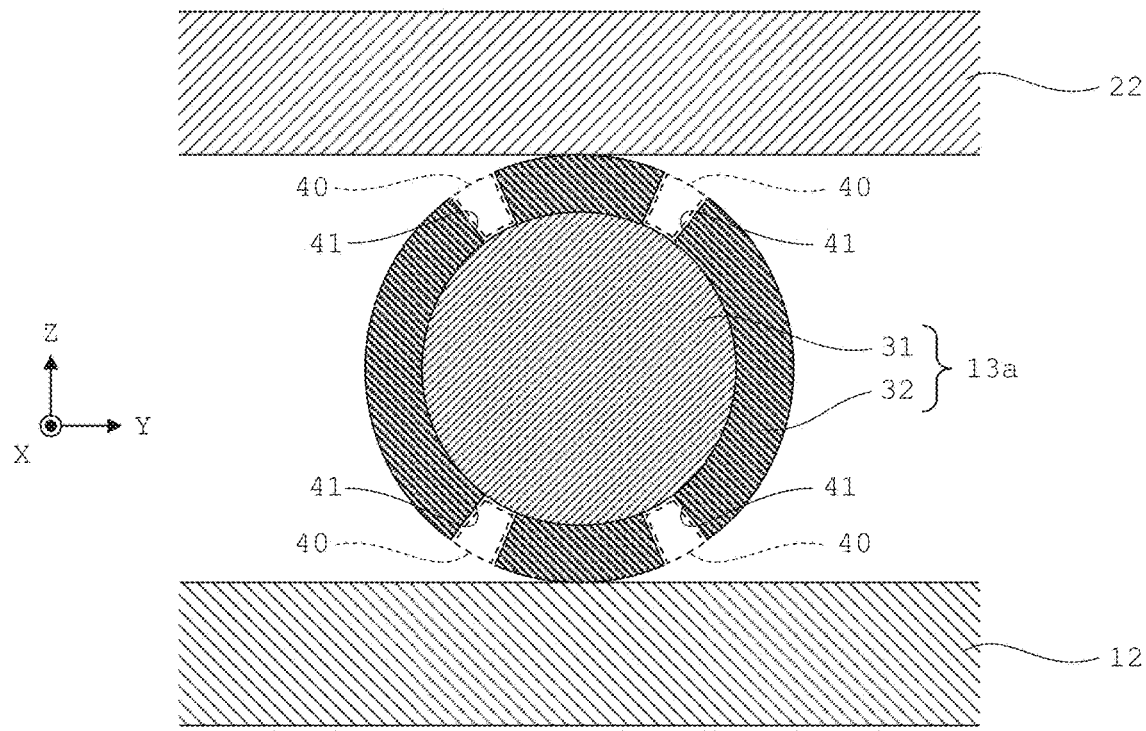
FIG. 6A and FIG. 6B are each an enlarged cross-sectional view schematically showing surroundings of the conductor wire viewed in the X-axis negative direction, according to Embodiment 1.
Figure 6B:
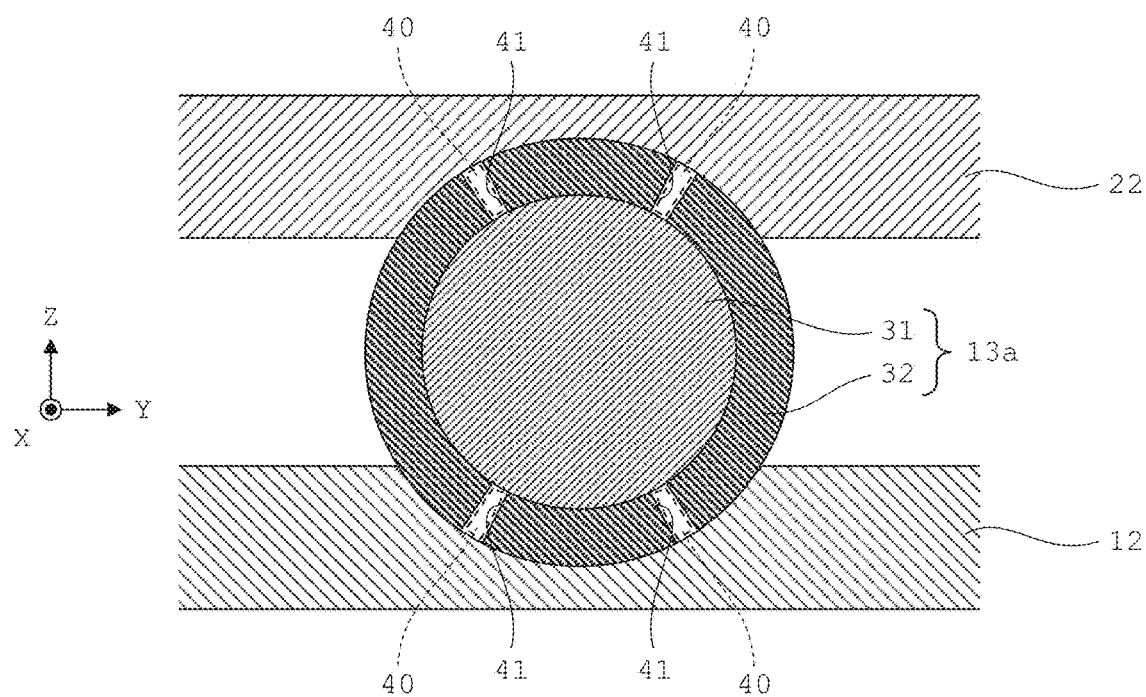

FIGS. 6A, 6B are each an enlarged cross-sectional view schematically showing surroundings of the conductor wire 13a viewed in the X-axis negative direction. In FIGS. 6A, 6B, the base members 11, 21 are not shown for convenience. FIG. 6A shows a state where no load is applied to the base members 11, 21, and FIG. 6B shows a state where loads are applied to the base members 11, 21.

As shown in FIG. 6A, when no load is applied to the base members 11, 21, the width of each clearance 41 is a width in the initial state. From this state, when loads are applied to the base members 11, 21, the dielectric body 32 moves toward the clearance 41 due to the stress caused in the dielectric body 32 by the loads, and the width of the clearance 41 is decreased, as shown in FIG. 6B. That is, the stress applied to the dielectric body 32 is released to the clearance 41. Accordingly, breakage of the dielectric body 32 can be prevented.

The clearance 41 is formed so as to have such a width that does not allow contact between the electrically-conductive elastic bodies 12, 22 and the wire member 31. In a state where loads are applied to the base members 11, 21 as shown in FIG. 6B, if the electrically-conductive elastic bodies 12, 22 come into the clearance 41 to be in contact with the wire member 31, the loads cannot be appropriately detected by the sensor part that includes this region. Therefore, the clearance 41 is formed so as to have such a width that does not allow contact between the electrically-conductive elastic bodies 12, 22 and the wire member 31 when loads are applied to the base members 11, 21.

In a case where the stress relaxation part 40 (in Embodiment 1, the clearance 41) is not provided to the dielectric body 32, when loads are applied to the base members 11, 21, the dielectric body 32 may be broken due to the stress caused in the dielectric body 32 by the loads, resulting in a hole of not less than about 10 μm in the dielectric body 32. In this case, the electrically-conductive elastic bodies 12, 22 and the wire member 31 come into contact with each other through this hole to be electrically conducted with each other, whereby the loads cannot be appropriately detected. In contrast, according to Embodiment 1, the stress applied to the dielectric body 32 during load application is released to the stress relaxation part 40, and thus, breakage of the dielectric body 32 due to the stress can be inhibited. Therefore, the load applied to the load sensor 1 can be appropriately detected.

Figure 7A:
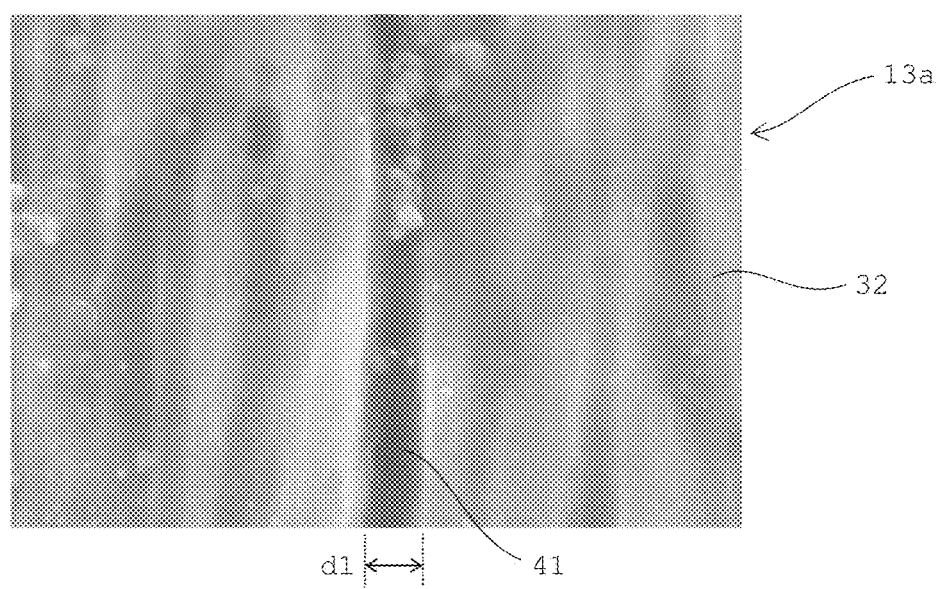
FIG. 7A to FIG. 7C are each an image, taken by a scanning electron microscope, of a dielectric body and a clearance actually created by the inventors, according to Embodiment 1.
Figure 7B:
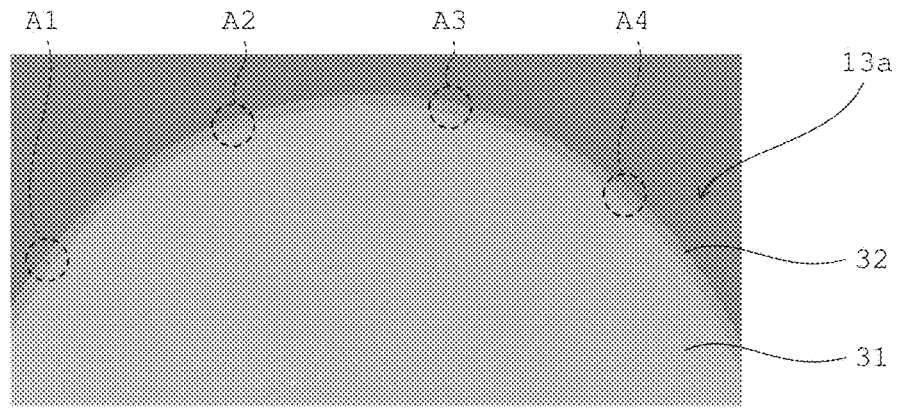
Figure 7C:
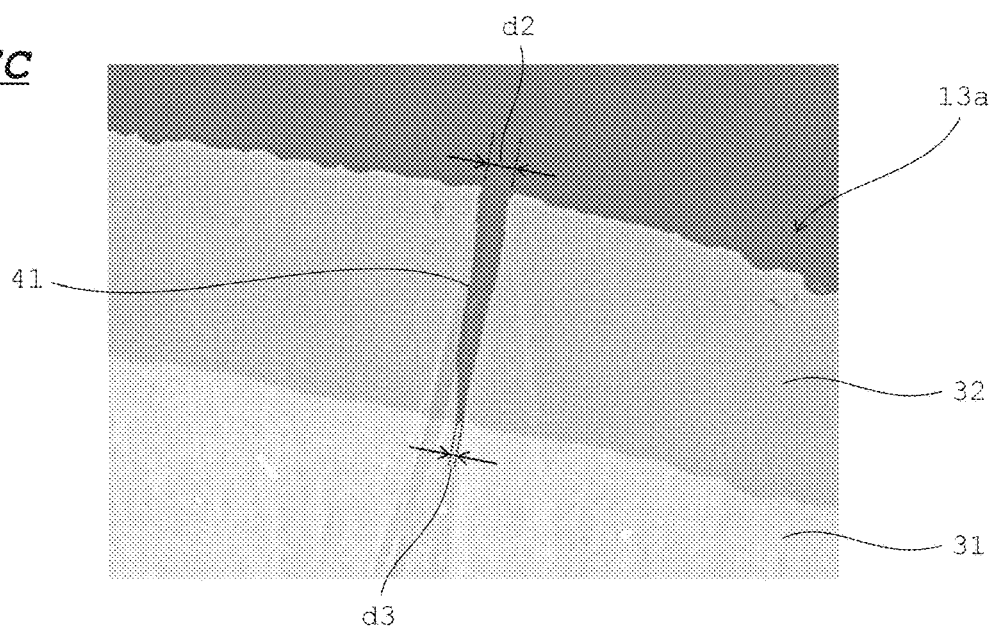

FIGS. 7A to 7C are each an image, taken by a scanning electron microscope (SEM), of the dielectric body 32 and the clearance 41 actually created by the inventors.

FIG. 7A is an image of the surface of the conductor wire 13a taken in a direction perpendicular to the direction in which the conductor wire 13a extends. In a portion near the center of FIG. 7A, the clearance 41 extends in the up-down direction (in FIG. 5, the X-axis direction). A width d1 of this clearance 41 is about 1 μm.

FIG. 7B is a cross-sectional image of the conductor wire 13a. In FIG. 7B, a cross-sectional image of a half region of the conductor wire 13a is shown, and in the dielectric body 32, the clearance 41 having a crack shape is formed at the positions of regions A1, A2, A3, A4.

FIG. 7C is an enlarged image of the region A3 in FIG. 7B. The clearance 41 in the region A3 has a width that is increased toward the surface of the dielectric body 32, and penetrates the dielectric body 32 in the thickness direction. Specifically, a width d2 of the clearance 41 at the surface of the dielectric body 32 is about 1 μm, and a width d3 of the clearance 41 at the surface of the wire member 31 is smaller than 1 μm.

Next, the inventors actually created the load sensor 1 based on Embodiment 1, and performed an experiment in which: a load was repeatedly applied to the created load sensor 1; and whether or not the load could be appropriately detected was verified.

With reference to FIG. 8A, the size of each component of the load sensor 1 used in the experiment will be described. FIG. 8A is a cross-sectional view schematically showing surroundings of the conductor wire 13a viewed in the X-axis negative direction. In this experiment, only one sensor part is formed, and in the sensor part, the base members 11, 21 and the electrically-conductive elastic bodies 12, 22 are disposed, as in FIGS. 3A, 3B, so as to sandwich two conductor wires 13a extending in the X-axis direction.

In the experiment, a thickness d10 of the base members 11, 21 was set to 1 mm, a thickness d20 of the electrically-conductive elastic bodies 12, 22 was set to about 30 μm, a diameter d30 of each conductor wire 13a was set to 0.5 mm, a diameter d31 of the wire member 31 was set to about 0.494 mm, and a thickness d32 of the dielectric body 32 was set to 6.3 μm to 6.7 μm. The clearance 41 was formed as the stress relaxation part 40 in the dielectric body 32 as shown in FIG. 5 to FIG. 7B. In this experiment, the base members 11, 21 were formed from the same material as that of the electrically-conductive elastic bodies 12, 22, for convenience.

The electrically-conductive elastic bodies 12, 22 were connected to a ground (GND), and the two wire members 31 were connected to each other. The load sensor 1 set as shown in FIG. 8A was set to a fixing base, and a load was repeatedly applied from above the base member 21. After the load was applied 1000 times, 2000 times, 3000 times, 4000 times, 5000 times, and 10000 times, the capacitance between the wire member 31 and the electrically-conductive elastic body 12, 22 during load application was measured.

FIG. 8B is a graph showing the relationship between the load and the capacitance obtained in the experiment.

As shown in FIG. 8B, curves obtained after applying loads predetermined numbers of times each have an appropriate shape in which the capacitance is uniquely determined in accordance with the load. When breakage has occurred in the dielectric body 32, a load having not less than a predetermined magnitude is applied. Accordingly, a short circuit occurs between the electrically-conductive elastic body 12, 22 and the wire member 31, and the capacitance value sharply decreases. In FIG. 8B, such a sharp decrease in the capacitance value has not occurred in any of the curves.

Therefore, it has been found that, as in the present embodiment, when the clearance 41 is formed as the stress relaxation part 40 in the dielectric body 32, even if a load has been applied a sufficiently large number of times such as about 10000 times, breakage of the dielectric body 32 can be inhibited. In addition, even after a load has been applied about 10000 times, the curve showing the relationship between the load and the capacitance has an appropriate shape. Thus, it has been found that the load can be appropriately detected, based on the capacitance.

Effects of Embodiment 1

According to Embodiment 1, the following effects are exhibited.

As shown in FIG. 5 to FIG. 7C, the dielectric body 32 includes the stress relaxation part 40 for releasing stress applied to the dielectric body 32 during load application. Accordingly, a large stress is inhibited from being applied to the dielectric body 32, and thus, breakage of the dielectric body 32 due to the stress during load application can be prevented. Therefore, the load can be appropriately detected while breakage of the dielectric body 32 is inhibited.

The stress relaxation part 40 includes a portion (the clearance 41) where the dielectric body 32 is discontinuous. Accordingly, the stress applied to the dielectric body 32 during load application is released to the discontinuous portion. Thus, breakage of the dielectric body 32 due to the stress is less likely to occur.

The stress relaxation part 40 is the clearance 41 that has a crack shape and that is formed in the dielectric body 32, and the clearance 41 has a width that does not allow contact between the electrically-conductive elastic bodies 12, 22 and the wire member 31 during load application. In Embodiment 1, by using the anodization method, it is possible to easily form, in a production step, a clearance 41 (crack) having a width that does not allow contact between the electrically-conductive elastic bodies 12, 22 and the wire member 31 during load application. Therefore, while the accuracy in load detection is maintained, a crack for breakage prevention can be easily formed.

The clearance 41 has a width that is increased toward the surface of the dielectric body 32. It is normally assumed that, during load application, expansion and contraction of the dielectric body 32 are increased on the surface side of the dielectric body 32. Therefore, when the width of the clearance 41 is increased on the surface side of the dielectric body 32 to increase the degree of freedom of expansion and contraction of the dielectric body 32, breakage of the dielectric body 32 can be smoothly inhibited.

The clearance 41 penetrates the dielectric body 32 in the thickness direction. Accordingly, the degree of freedom of expansion and contraction of the dielectric body 32 can be further increased. Thus, breakage of the dielectric body 32 can be further inhibited.

The dielectric body 32 is formed from an oxide (aluminum oxide). When the dielectric body 32 is formed from the oxide, the thickness of the dielectric body 32 can be decreased, and the permittivity of the dielectric body 32 can be increased. Accordingly, the sensitivity of the load sensor 1 can be increased. In general, when the thickness of the dielectric body 32 is decreased, the dielectric body 32 is more easily to be broken due to the stress during load application. In contrast, according to Embodiment 1, since the stress relaxation part 40 is provided as described above, breakage of the dielectric body 32 can be inhibited.

The dielectric body 32 is formed on the surface of the wire member 31. Accordingly, by merely forming the dielectric body 32 on the surface of the wire member 31, it is possible to set the dielectric body between the electrically-conductive elastic bodies 12, 22 and the wire member 31.

The dielectric body 32 is formed from an oxide (aluminum oxide) that includes the same composition as that of the wire member 31 (aluminum). Accordingly, the interface strength between the wire member 31 and the dielectric body 32 becomes strong, and thus, the dielectric body 32 is less likely to be detached from the wire member 31 due to the stress during load application. Therefore, the reliability of the load sensor 1 can be increased. In addition, when the wire member 31 is formed from aluminum and the dielectric body 32 is formed from aluminum oxide, the conductor wire 13a can be formed inexpensively and speedily through a simple process.

The dielectric body 32 is formed from aluminum oxide having a relative permittivity of about 8.5. Thus, when the dielectric body 32 is formed from a material having a relative permittivity that is greater than 3.5, the capacitance between the electrically-conductive elastic body 12, 22 and the wire member 31 is increased. Therefore, the sensitivity characteristic of the load sensor 1 can be increased.

Embodiment 2

In Embodiment 1, the stress relaxation part 40 is the clearance 41 formed in the dielectric body 32. However, as long as the stress applied to the dielectric body 32 during load application can be released, another dielectric body, instead of the clearance 41, may be disposed at the stress relaxation part 40. In Embodiment 2, another dielectric body 42 is disposed at the stress relaxation part 40. The other configurations in Embodiment 2 are the same as those in Embodiment 1.

FIG. 9 is a perspective view schematically showing a configuration of the conductor wire 13a, according to Embodiment 2.

In Embodiment 2, similar to Embodiment 1, the dielectric body 32 is formed on the surface of the wire member 31, and the clearance 41 similar to that in Embodiment 1 is formed in the dielectric body 32. Then, in this clearance 41, the other dielectric body 42 having an elasticity higher than that of the dielectric body 32 (i.e., having an elastic modulus lower than that of the dielectric body 32) is formed through an electrodeposition process, for example. The other dielectric body 42 is formed from a resin material, for example. The other dielectric body 42 is a resin material of at least one type selected from the group consisting of a polypropylene resin, a polyester resin (e.g., polyethylene terephthalate resin), a polyimide resin, a polyphenylene sulfide resin, a polyvinyl formal resin, a polyurethane resin, a polyamide imide resin, a polyamide resin, and the like.

The permittivity of the other dielectric body 42 is set to be at a level similar to that of the permittivity of the dielectric body 32. However, not limited thereto, the permittivity of the other dielectric body 42 may be greater than the permittivity of the dielectric body 32, or may be less than the permittivity of the dielectric body 32.

Figure 10A:
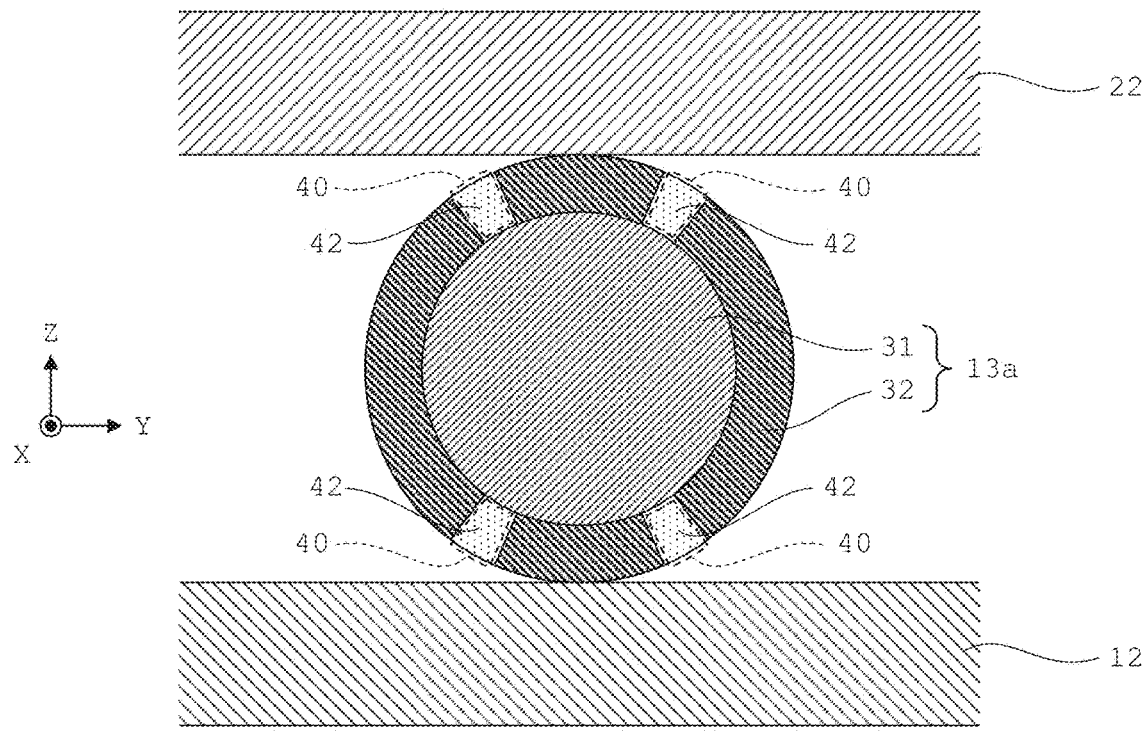
FIG. 10A and FIG. 10B are each an enlarged cross-sectional view schematically showing surroundings of the conductor wire viewed in the X-axis negative direction, according to Embodiment 2.
Figure 10B:
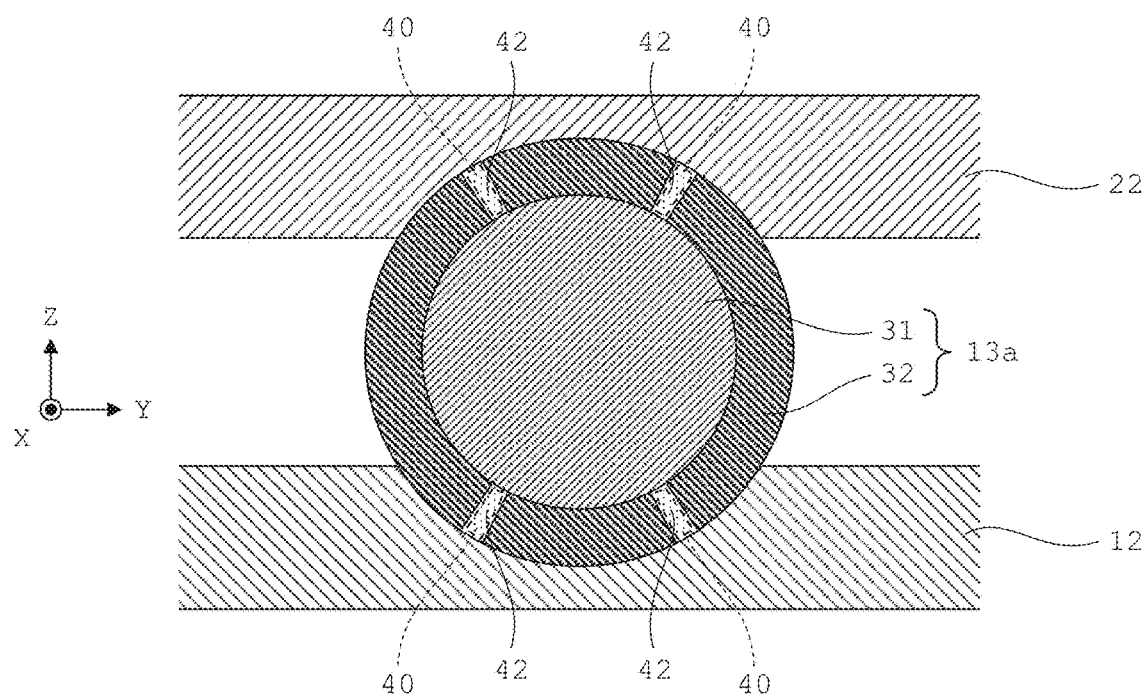

FIGS. 10A, 10B are each an enlarged cross-sectional view schematically showing the conductor wire 13a viewed in the X-axis negative direction, according to Embodiment 2.

As shown in FIGS. 10A, 10B, in Embodiment 2 as well, when loads are applied to the base members 11, 21, the dielectric body 32 moves toward the other dielectric body 42 due to the stress caused in the dielectric body 32 by the loads, and the width of the other dielectric body 42 is decreased. That is, the stress applied to the dielectric body 32 is released to the other dielectric body 42. Accordingly, breakage of the dielectric body 32 can be prevented.

Effects of Embodiment 2

According to Embodiment 2, the following effects are exhibited.

The stress relaxation part 40 is formed by the dielectric body 32 being separated along the surface of the dielectric body 32, and the other dielectric body 42 having an elasticity higher than that of the dielectric body 32 is formed in the stress relaxation part 40. Accordingly, the stress applied to the dielectric body 32 due to application of loads to the base members 11, 21 is released to the other dielectric body 42 formed in the stress relaxation part 40, and thus, breakage of the dielectric body 32 can be inhibited. In addition, since the other dielectric body 42 is formed in the stress relaxation part 40, change in the permittivity during load application can be stabilized when compared with a case where the clearance 41 is formed in the stress relaxation part 40.

Embodiment 3

In Embodiment 1, the stress relaxation part 40 is the clearance 41 having a width of about several μm and extending in the direction (the Y-axis direction) in which the conductor wire 13a extends. In Embodiment 3, as the stress relaxation part 40, pores are formed instead of the clearance 41. The other configurations in Embodiment 3 are the same as those in Embodiment 1.

FIG. 11 is a perspective view schematically showing a configuration of the conductor wire 13a, according to Embodiment 3.

In Embodiment 3, through adjustment of settings of the anodization (alumite treatment), pores 43 are formed in the dielectric body 32 formed on the entire periphery of the wire member 31. Each pore 43 extends in the thickness direction (the radial direction with respect to the center of the wire member 31) of the dielectric body 32. The pore 43 has a length of not less than ⅓ from the surface side with respect to the thickness of the dielectric body 32. The pore 43 is a hole having a cylindrical shape. The diameter of the pore 43 in a direction perpendicular to the thickness direction of the dielectric body 32 is about 2 nm. When the conditions for the anodization (alumite treatment) during formation of the dielectric body 32 are adjusted, the diameter and the length of the pore 43 can be controlled. The diameter of the pore 43 is preferably not less than 1 nm and not greater than 100 nm. When the number of pores 43 viewed from the surface side is set to not less than 100/mm$^2$, the stress relaxation effect is increased. In addition to the pores 43, the clearance 41 and the other dielectric body 42 described above may be formed.

Figure 12A:
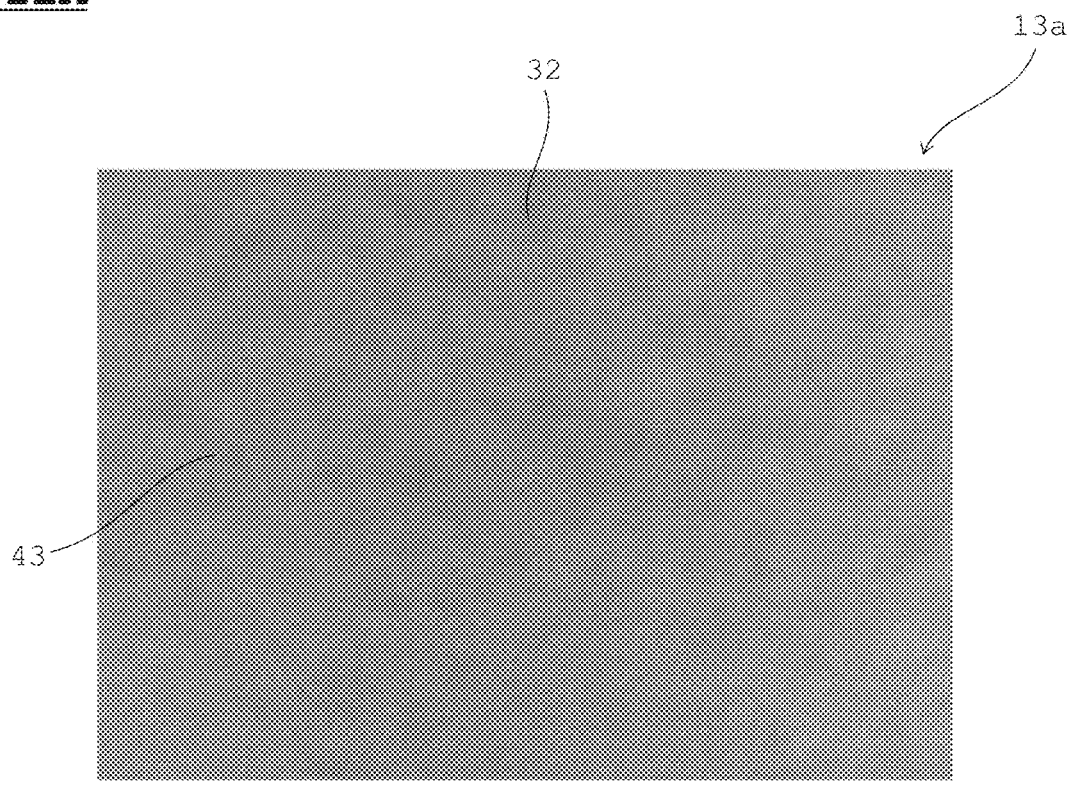
FIG. 12A and FIG. 12B are each an image, taken by a scanning electron microscope, of a dielectric body and pores actually created by the inventors, according to Embodiment 3.
Figure 12B:
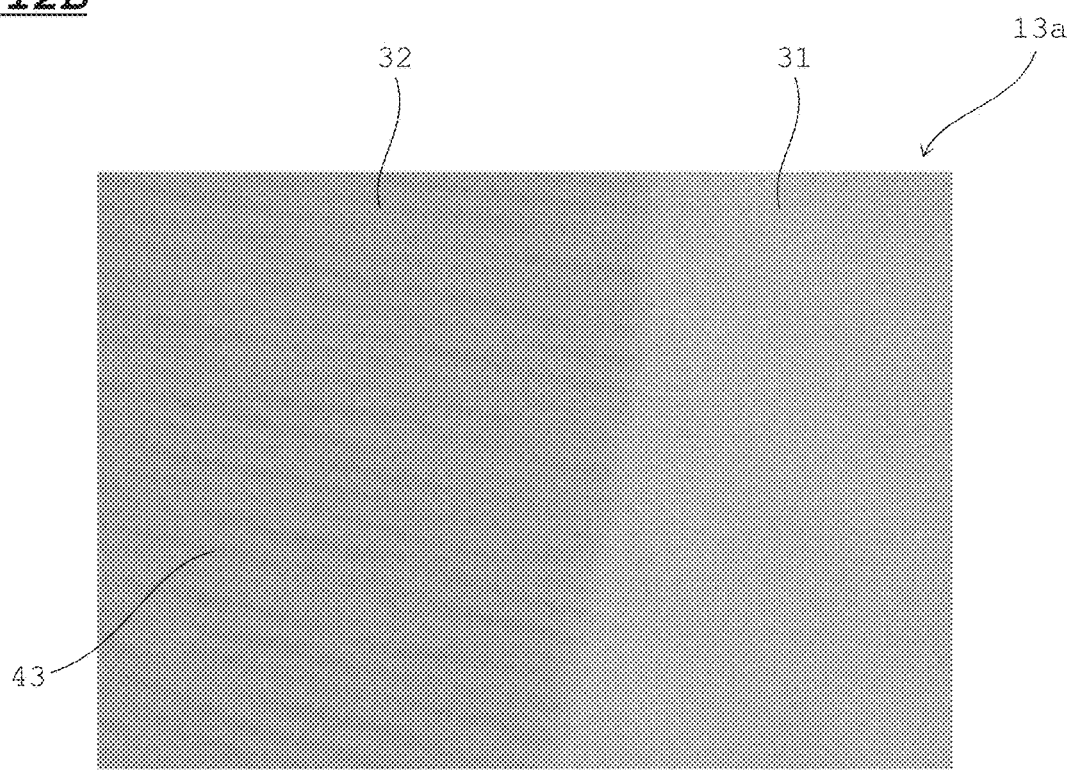

FIGS. 12A, 12B are each an image, taken by a scanning electron microscope (SEM), of the dielectric body 32 and the pores 43 actually created by the inventors.

FIG. 12A is an image, of the surface of the conductor wire 13a, taken from a direction perpendicular to the direction in which the conductor wire 13a extends. In FIG. 12A, it is seen that very small openings of the pores 43 are formed so as to be arranged in the surface of the dielectric body 32.

FIG. 12B is a cross-sectional image of the conductor wire 13a in the vicinity of the boundary between the wire member 31 and the dielectric body 32. In FIG. 12B, the direction from the lower right toward the upper left is the direction from the center of the wire member 31 toward outside. It is seen that a plurality of pores 43 extend along the direction from the center of the wire member 31 toward outside.

Effect of Embodiment 3

According to Embodiment 3, the following effects are exhibited.

The stress relaxation part 40 is the pores 43 formed in the dielectric body 32. Therefore, when a load is applied, the stress applied to the dielectric body 32 is released to the pores 43, and thus, breakage of the dielectric body 32 can be inhibited.

Each pore 43 extends in the thickness direction of the dielectric body 32. Therefore, even when the dielectric body 32 expands and contracts in a direction perpendicular to the thickness direction due to the stress during load application, the expansion and contraction are absorbed by the pores 43. Accordingly, breakage of the dielectric body 32 due to the stress during load application can be more effectively inhibited.

The pore 43 has a length of not less than ⅓ from the surface side with respect to the thickness of the dielectric body 32. Accordingly, the degree of freedom of expansion and contraction of the dielectric body 32 in a direction perpendicular to the thickness direction can be increased. Thus, an appropriate stress relaxation effect can be realized, and breakage of the dielectric body 32 can be inhibited. In addition, since the pore 43 is a hole having a very small diameter, unintentional contact between the electrically-conductive elastic bodies 12, 22 and the wire member 31 during load application can be avoided.

Modification

The configuration of the load sensor 1 can be modified in various ways other than the configurations shown in the above embodiments.

For example, in Embodiments 1, 2 above, as shown in FIGS. 6A, 6B and FIGS. 10A, 10B, four stress relaxation parts 40 are provided in the circumferential direction of the wire member 31. However, the number of stress relaxation parts 40 provided at the surface of the wire member 31 is not limited thereto.

In Embodiments 1 to 3 above, the wire member 31 is formed from aluminum, and the dielectric body 32 is formed from aluminum oxide. However, the materials forming the wire member 31 and the dielectric body 32 are not limited thereto. For example, the wire member 31 may be formed from tantalum, and the dielectric body 32 may be formed from a tantalum oxide. Alternatively, the wire member 31 may be formed from niobium, and the dielectric body 32 may be formed from a niobium oxide. Other than these, as the wire member 31, a valve action metal such as aluminum (Al), titanium (Ti), tantalum (Ta), niobium (Nb), zirconium (Zr), or hafnium (Hf), and an alloy including these can be used. In this case as well, the dielectric body 32 is formed from an oxide of the wire member 31. When the dielectric body 32 is an oxide that includes the same composition as that of the wire member 31, the dielectric body 32 is less likely to be detached from the wire member 31, and the reliability of the load sensor 1 can be increased, as described above.

Further, in Embodiments 1 to 3 above, the dielectric body 32 need not necessarily be an oxide that includes the same composition as that of the wire member 31. For example, the wire member 31 may be formed from copper, and the dielectric body 32 may be formed from aluminum oxide. However, in this case, the interface strength between the wire member 31 and the dielectric body 32 is less likely to be strong. Thus, preferably, the dielectric body 32 is an oxide that includes the same composition as that of the wire member 31.

In Embodiments 1 to 3 above, the dielectric body 32 having the stress relaxation part 40 is formed on the surface of the wire member 31 through the anodization (alumite treatment). However, the formation method for the dielectric body 32 is not limited thereto. As long as the stress relaxation part 40 including the clearance 41, the other dielectric body 42, the pores 43, and the like can be appropriately formed while avoiding contact between the wire member 31 and the electrically-conductive elastic bodies 12, 22 during load application, the dielectric body 32 may be formed through a treatment other than the treatment based on the anodization method.

In Embodiment 1 above, as shown in FIG. 5 to FIG. 7C, the clearance 41 penetrates the dielectric body 32 in the thickness direction. However, not limited thereto, the clearance 41 may be provided to a part in the thickness direction of the dielectric body 32. In Embodiment 2 above, as shown in FIG. 9 to FIG. 10B, the other dielectric body 42 is set in the clearance penetrating the dielectric body 32 in the thickness direction. However, not limited thereto, the other dielectric body 42 may be set to a cutout provided to a part in the thickness direction of the dielectric body 32. In Embodiment 3 above, the pores 43 may be formed so as to penetrate the dielectric body 32 in the thickness direction.

When the clearance 41 and the other dielectric body 42 are provided to a part in the thickness direction of the dielectric body 32, these are preferably provided on the surface side of the dielectric body 32, and are preferably provided so as to have a length of not less than ⅓ of the thickness of the dielectric body 32. Accordingly, the dielectric body 32 on the surface side where the dielectric body 32 is more likely to be influenced by the stress during load application is allowed to smoothly move to the clearance 41 and the other dielectric body 42, and thus, breakage of the dielectric body 32 due to the stress can be appropriately inhibited.

In Embodiment 1, the dielectric body 32 having the clearance 41 is formed on the surface of the wire member 31, through adjustment of the film growth in the anodization (alumite treatment). However, the method for providing the clearance 41 in the dielectric body 32 is not limited thereto. For example, a masking treatment is performed on the surface of the wire member 31, and in this state, the dielectric body 32 may be formed on the surface of the wire member 31. Accordingly, at the position where the masking treatment has been performed, the clearance 41 having a crack shape is formed. Alternatively, after the dielectric body 32 has been formed without any gap on the surface of the wire member 31, the clearance 41 may be formed through etching.

Further, also in Embodiment 2 above, by another method capable of forming the clearance 41 in Embodiment 1 described above, a clearance corresponding to the other dielectric body 42 may be formed in the dielectric body 32. In Embodiment 2, since the other dielectric body 42 is disposed in the clearance formed in the dielectric body 32, the width of the clearance in the dielectric body 32 may be greater to some extent than the width of the clearance 41 of Embodiment 1. Therefore, for example, the dielectric body 32 is formed over the entire periphery of the wire member 31 and a part of the wire member 31 is removed, whereby a clearance for disposing the other dielectric body 42 may be formed. Alternatively, a masking member such as a tape or a thread is set on the wire member 31, and in this state, the dielectric body 32 may be formed on the surface of the wire member 31. Accordingly, a clearance for disposing the other dielectric body 42 is formed at the position of the masking member.

In Embodiment 3 above, the method for providing the pores 43 in the dielectric body 32 is not limited to the anodization (alumite treatment).

In Embodiments 1 to 3 above, as shown in FIG. 2B, the load sensor 1 includes three pairs of conductor wires 13. However, the load sensor 1 only needs to include at least one pair of conductor wires 13. For example, the number of pairs of conductor wires 13 included in the load sensor 1 may be 1.

In Embodiments 1 to 3 above, as shown in FIG. 2B, the load sensor 1 includes three sets of electrically-conductive elastic bodies 12, 22 that oppose each other in the up-down direction. However, the load sensor 1 only needs to include at least one set of electrically-conductive elastic bodies 12, 22. For example, the number of sets of electrically-conductive elastic bodies 12, 22 included in the load sensor 1 may be 1.

In Embodiments 1 to 3 above, the electrically-conductive elastic bodies 22 on the base member 21 side may be omitted. In this case, each pair of conductor wires 13 is sandwiched by the electrically-conductive elastic bodies 12 on the base member 11 side and the opposing face 21a of the base member 21, and the pair of conductor wires 13 sinks into the electrically-conductive elastic bodies 12 in accordance with the load, whereby capacitance in each sensor part changes. When the electrically-conductive elastic bodies 22 on the base member 21 side are omitted, a sheet-shaped base member may be set instead of the base member 21.

In Embodiments 1 to 3 above, one pair of conductor wires 13 has a shape in which two conductor wires 13a arranged in the Y-axis direction are connected to each other at end portions in the X-axis direction. However, instead of one pair of conductor wires 13, one conductor wire may be disposed, or three or more conductor wires may be disposed. Further, in a plan view, the shape of the pair of conductor wires 13 need not necessarily be a linear shape and may be a wave shape.

In Embodiments 1 to 3 above, the dielectric body 32 is formed on the surface of the wire member 31. However, not limited thereto, the dielectric body 32 may be formed on the surfaces of the electrically-conductive elastic bodies 12, 22.

In addition to the above, various modifications can be made as appropriate to the embodiments of the present invention without departing from the scope of the technical idea defined by the claims.

What is claimed is:

1. A load sensor comprising:
   a first base member having a first surface and a second surface opposite to the first surface;
   a second base member having a third surface and a fourth surface opposite to the third surface, the second base member being disposed so as the first surface of the first base member and the third surface of the second base member face each other;
   an electrically-conductive elastic body disposed on the first surface of the first base member;
   a wire member that is electrically conductive and disposed between the third surface of the second base member and the electrically-conductive elastic body disposed on the first surface of the first base member; and
   a dielectric body having an inner surface and an outer surface opposite to the inner surface and disposed between the electrically-conductive elastic body and the wire member such that the outer surface faces the electrically-conductive elastic body and the inner surface faces the wire member,
   wherein the dielectric body has a stress relaxation part for releasing stress applied to the dielectric body during load application,
   wherein the stress relaxation part includes a gap that penetrates through the dielectric body such that the gap extends from the inner surface and the outer surface of the dielectric body.

2. The load sensor according to claim 1, wherein the stress relaxation part includes a portion where the dielectric body is discontinuous.

3. The load sensor according to claim 2, wherein
   the gap has a crack shape and is formed in the dielectric body, and
   the gap has a width that does not allow contact between the electrically-conductive elastic body and the wire member during load application.

4. The load sensor according to claim 3, wherein the gap has a width that is increased toward a surface of the dielectric body.

5. The load sensor according to claim 2, wherein
   the stress relaxation part is formed by the dielectric body being separated along the outer surface of the dielectric body, and
   another dielectric body having an elasticity higher than that of the dielectric body is formed in the stress relaxation part.

6. The load sensor according to claim 2, wherein the stress relaxation part includes pores formed in the dielectric body.

7. The load sensor according to claim 6, wherein each pore extends longitudinally within the dielectric body in a radial direction of the wire member.

8. The load sensor according to claim 7, wherein the pore has a length of not less than ⅓ from a surface side with respect to a thickness of the dielectric body.

9. The load sensor according to claim 1, wherein the dielectric body is formed from an oxide.

10. The load sensor according to claim 1, wherein the dielectric body is formed on a surface of the wire member.

11. The load sensor according to claim 10, wherein the dielectric body is formed from an oxide that includes a same composition as that of the wire member.

12. The load sensor according to claim 1, wherein the dielectric body is formed from a material having a relative permittivity that is greater than 3.5.

* * * * *